United States Patent
Disorbo

(10) Patent No.: US 9,868,589 B2
(45) Date of Patent: Jan. 16, 2018

(54) MODULAR TRANSPORTATION SYSTEMS, DEVICES AND METHODS

(71) Applicant: Aldo Disorbo, Margate, FL (US)

(72) Inventor: Aldo Disorbo, Margate, FL (US)

(73) Assignee: Cargo Cube Systems, LLC

( * ) Notice: Subject to any disclaimer, the term of this patent is extended or adjusted under 35 U.S.C. 154(b) by 0 days.

(21) Appl. No.: 14/361,280

(22) PCT Filed: Apr. 15, 2014

(86) PCT No.: PCT/US2014/034186
§ 371 (c)(1),
(2) Date: May 28, 2014

(87) PCT Pub. No.: WO2015/041724
PCT Pub. Date: Mar. 26, 2015

(65) Prior Publication Data
US 2015/0344222 A1    Dec. 3, 2015

Related U.S. Application Data

(63) Continuation-in-part of application No. 14/242,998, filed on Apr. 2, 2014.
(Continued)

(51) Int. Cl.
*B65D 88/12* (2006.01)
*B65D 88/02* (2006.01)
(Continued)

(52) U.S. Cl.
CPC ............... *B65D 88/12* (2013.01); *B60P 1/36* (2013.01); *B60P 1/52* (2013.01); *B65D 19/0004* (2013.01); *B65D 88/02* (2013.01); *B65D 88/129* (2013.01); *B65D 88/30* (2013.01); *B65D 88/546* (2013.01); *B65D 90/00* (2013.01); *B65D 90/0053* (2013.01); *B65D 90/0066* (2013.01); *B65D 90/587* (2013.01); *B65G 63/004* (2013.01);
(Continued)

(58) Field of Classification Search
CPC .................................. B60P 1/52; B65D 88/02
USPC .............. 410/66, 67, 46; 108/57.15; 220/1.5
See application file for complete search history.

(56) References Cited

U.S. PATENT DOCUMENTS 1,693,607 A    12/1928   Platts
2,172,154 A     9/1939   Perin
(Continued)

FOREIGN PATENT DOCUMENTS

CA    2144886       9/1996
DE    25 01 414     7/1975

*Primary Examiner* — Stephen T Gordon
(74) *Attorney, Agent, or Firm* — Jennifer Meredith, Esq.; Meredith & Keyhani, PLLC

(57) ABSTRACT

A system including devices and methods for transporting or storing materials uses slidable containers, or modules. The modules have recessed wheels that facilitate sliding movement when placed on tracks. The use of tracks allows for precise placement of the modules in close proximity to each other and the walls of a vessel or facility they are placed in. The modules may be disassembled for easy, compact storage or transport. The modules may be used with a lift platform adapted to accommodate the modules and tracks or rails for engaging the recessed wheels. By using closely aligned tracks, the transport module may be used to maximize efficient use of space when transporting cargo.

6 Claims, 27 Drawing Sheets

Related U.S. Application Data

(60) Provisional application No. 61/927,957, filed on Jan. 15, 2014.

(51) Int. Cl.

| | | |
|---|---|---|
| *B60P 1/52* | (2006.01) | |
| *B60P 1/36* | (2006.01) | |
| *B65D 19/00* | (2006.01) | |
| *B65D 88/54* | (2006.01) | |
| *B65G 63/00* | (2006.01) | |
| *B65G 67/02* | (2006.01) | |
| *B65D 88/30* | (2006.01) | |
| *B65D 90/00* | (2006.01) | |
| *B65D 90/58* | (2006.01) | |

(52) U.S. Cl.
CPC ...... *B65G 67/02* (2013.01); *B65D 2590/0066* (2013.01)

(56) References Cited

U.S. PATENT DOCUMENTS

| | | |
|---|---|---|
| 2,287,886 A | 6/1942 | Kellett |
| 2,858,774 A | 11/1958 | Lee |
| 2,988,036 A | 6/1961 | Mooneyhan |
| 3,169,652 A | 2/1965 | Ewell |
| 3,315,826 A | 4/1967 | Gardner |
| 3,722,705 A | 3/1973 | Gould |
| 3,735,884 A * | 5/1973 | Klett ............... B60P 7/08 238/10 R |
| 3,779,406 A | 12/1973 | Hermann |
| 3,854,544 A | 12/1974 | Kolchev |
| 3,866,539 A | 2/1975 | Gasser |
| 3,982,639 A | 9/1976 | Haldimann |
| 4,130,208 A | 12/1978 | Barry |
| 4,231,695 A | 11/1980 | Weston |
| 4,273,217 A | 6/1981 | Kajita |
| 4,344,368 A * | 8/1982 | Remington ............... 108/57.15 |
| 4,421,186 A | 12/1983 | Bradley |
| 4,537,554 A | 8/1985 | Collins |
| 4,640,657 A | 2/1987 | Moore |
| 4,699,337 A | 10/1987 | Lewis |
| 4,747,504 A | 5/1988 | Wiseman |
| 4,770,589 A | 9/1988 | Bryan |
| 4,976,365 A | 12/1990 | Seo |
| 5,054,295 A | 10/1991 | Goulooze |
| 6,485,239 B2 * | 11/2002 | Afful ............................... 410/46 |
| 6,622,854 B2 | 9/2003 | Coblentz |
| 6,685,404 B2 * | 2/2004 | Udivich ............... B60P 3/055 410/42 |
| 6,824,338 B2 | 11/2004 | Looker |
| 7,482,928 B2 | 1/2009 | Brackmann |
| 7,686,550 B2 | 3/2010 | Mix |
| 8,353,388 B2 | 1/2013 | Rice |
| 8,474,223 B2 | 7/2013 | Lancaster |
| 8,718,372 B2 | 5/2014 | Holeva |
| 9,056,577 B2 | 6/2015 | Corrigan |
| 2005/0226706 A1 | 10/2005 | Thomas |
| 2008/0211669 A1 | 9/2008 | Dagher |
| 2009/0202330 A1 | 8/2009 | Hamather |
| 2010/0091094 A1 | 4/2010 | Sekowski |
| 2010/0147841 A1 | 6/2010 | Reynard |
| 2011/0234389 A1 | 9/2011 | Mellin |
| 2012/0177467 A1 | 7/2012 | Corrigan |
| 2012/0205943 A1 | 8/2012 | Nelson |
| 2015/0053691 A1 | 2/2015 | Sanger |
| 2015/0117997 A1 | 4/2015 | Grady |
| 2015/0129444 A1 | 5/2015 | Witczak |
| 2016/0055506 A1 | 2/2016 | Tama |

\* cited by examiner

PRIOR ART

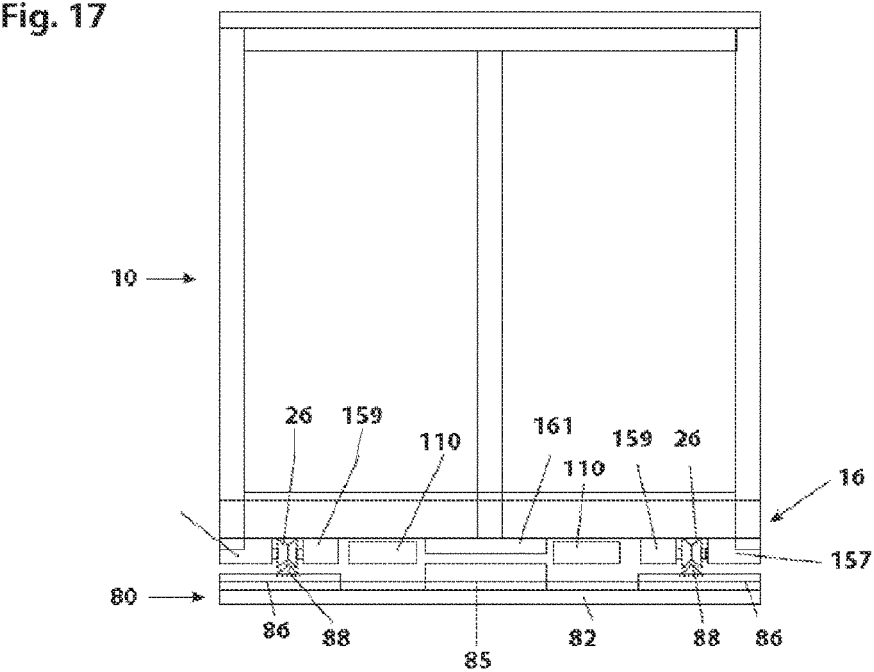
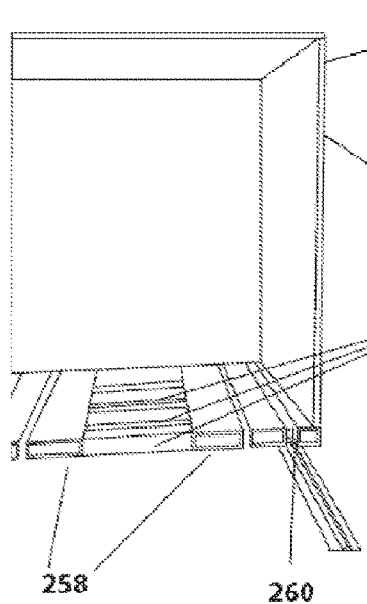
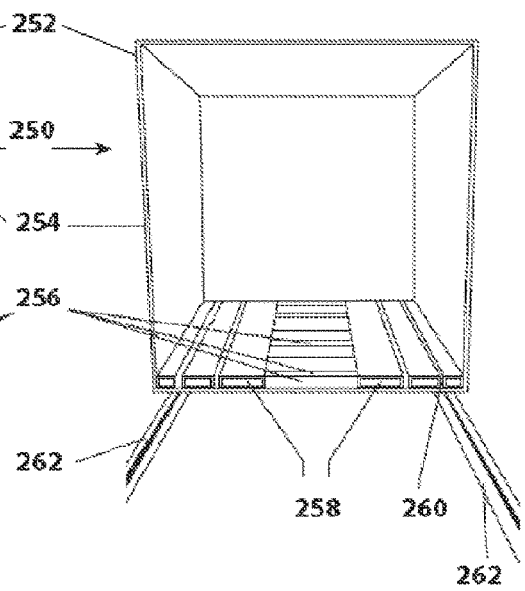

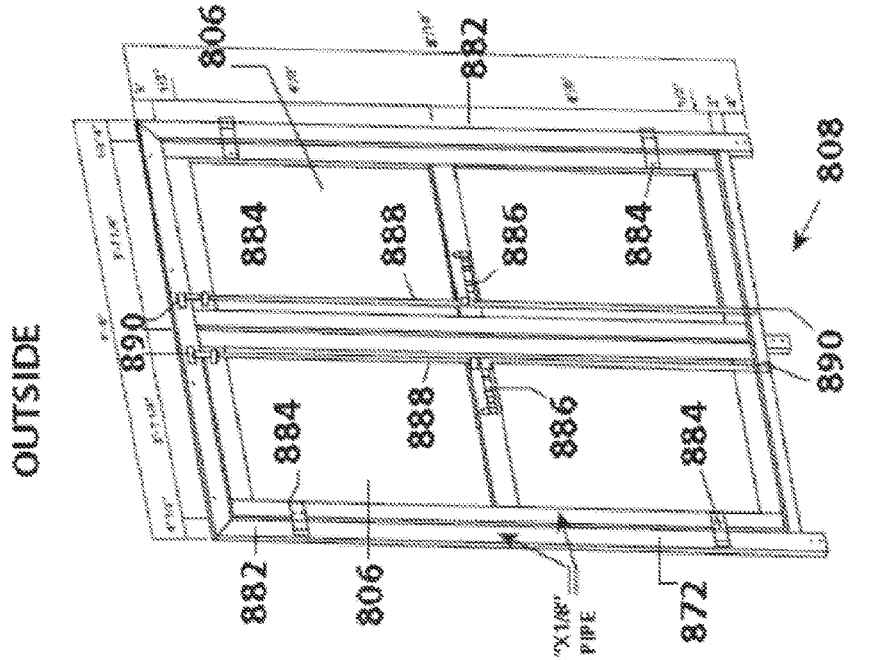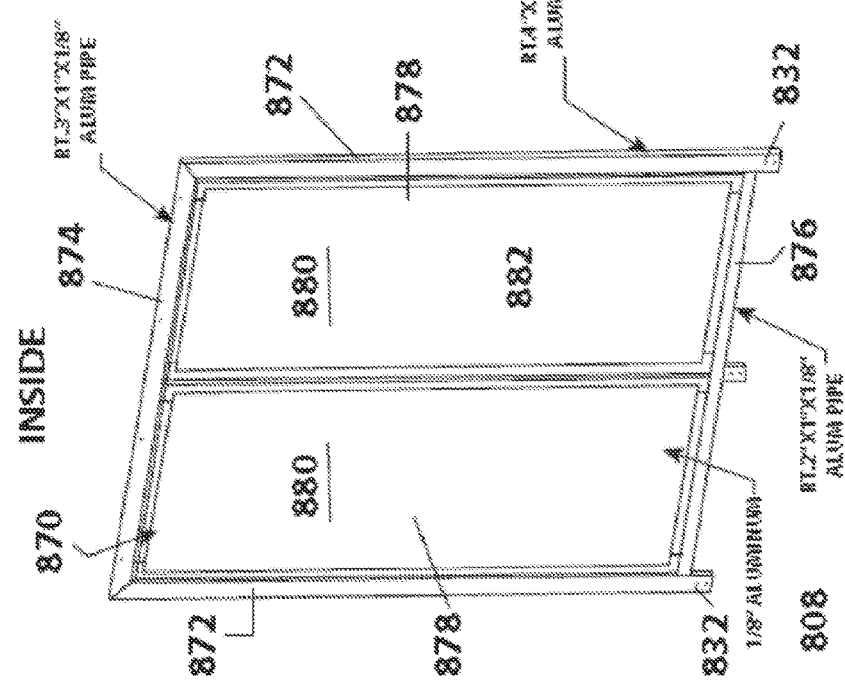

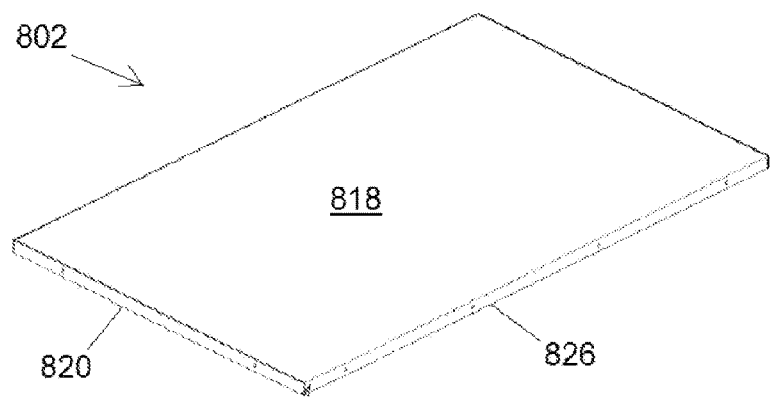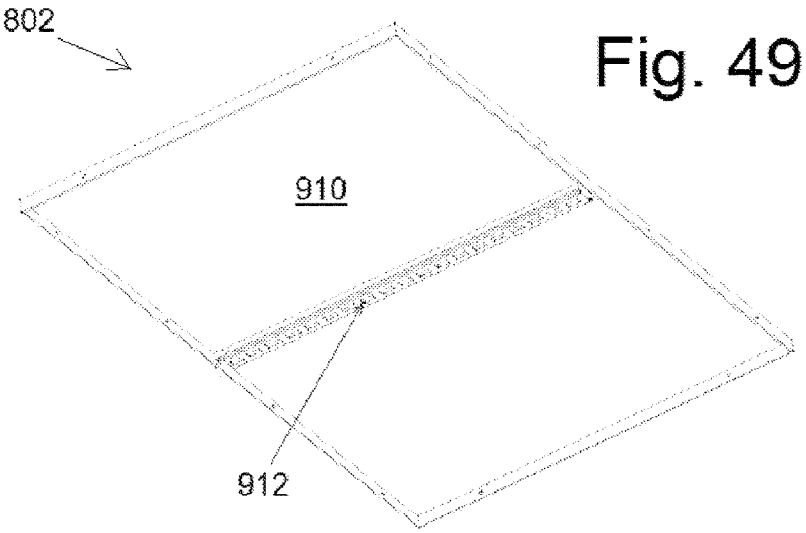
Fig. 49

MODULAR TRANSPORTATION SYSTEMS, DEVICES AND METHODS

CROSS-REFERENCE TO RELATED APPLICATIONS

This application is a national phase entry application under 35 USC 371 of international application number PCT?US14/034186 filed on Apr. 15, 2014 and claims priority to U.S. Utility patent application Ser. No. 14/242,998 filed on Apr. 2, 2014 and U.S. Provisional Application Ser. No. 61/927,957, filed Jan. 15, 2014, the contents of which are hereby incorporated in its entireties.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of Endeavor

The present invention relates generally to the field of containers for transportation, storage and shipping. More particularly, the invention relates to systems, apparatuses and methods for manipulating a storage container, loading it onto a vehicle, transporting it to another location, and unloading the container from the vehicle.

Background Information

In the shipping industry, it is desirable to utilize all of the space available at any given storage containers. The simple stacking of many boxes having nonuniform shapes often results in wasted space in a storage compartment. Unused space in a storage compartment also increases the likelihood that objects stored there. In will shift during transport and the objects they contain may be damaged or broken.

Modular shipping has become more common and large-scale shipping vessels. However, much ground transportation is not conducted efficiently. In addition, trailers used for shipping may be several feet off the ground. This requires the use of ramps or simply lifting by human operators to place objects in the trailer itself. Trailer lifts have also been developed to assist in this.

Once objects are placed inside a trailer. It is often challenging to stack and arrange the objects transported in an efficient manner utilizing all available space, and in such a way as to prevent shifting and damage during transport.

And distribution centers, where cargo is redistributed among trailers, forklifts, are commonly used. However, it is difficult to operate a forklift inside a trailer. In addition, pallets generally used with standard forklifts do not have the same dimensions as that of a trailer. Thus, using forklifts may require less manual labor, but does not improve the ability to maximize use of storage space.

Is therefore desirable to provide a means to efficiently maximize the amount of space used inside a storage, or transportation container.

It is also desirable to provide a means for efficiently arranging transported objects inside a trailer or other compartment.

BRIEF SUMMARY OF THE INVENTION

Accordingly, the primary object of the present invention is to provide modular shipping systems, apparatuses and methods for improving efficient use of space in storage compartments in the transport and shipping industries.

It is therefore an object of the present invention to provide a systems apparatuses and methods for improving transportation and storage of cargo.

In greater detail, In one embodiment, a transport module may be 8 ft. wide, 8.9 ft. high and 5 ft. deep. The transport module may be disassembled and reassembled during transportation when not in use. The module may have two swing doors, sliding doors, removable doors or other mechanisms for accessing the interior of the module for easy access once the module is assembled and placed on the ground. The module may be designed to fit in a rail container having dimensions of 9.08 feet high and 8.1 feet wide. A system for transporting or storing items may use the modules that may fit in a rail trailer or a regular trailer leaving 1 inch on both sides and the top. This may allow 10 modules to fit into one 53 foot container. This may increase efficiency of cross-country transportation.

The base of a module may have 4 or 6 (or more) roller wheels. Trailer and rail containers may be specifically built with, or retrofitted to include, tracks installed on their floors to engage the wheels of a module. The tracks may extend about 1 inch from the floor and have a similar width to that of the module's rollers. The rollers may be flush with the base of a module or recessed such that when the container sits on a floor, it will not roll away. The only time the container will roll may be when the roller engages a track on a lift platform, inside a transportation vessel, or otherwise on tracks designed to engage the rollers or wheels. This may allow an operator to load the cargo cube containers with 1 inch on both sides and the top and preventing human errors. As used herein, "roller" and "wheel" may be used interchangeably. As used herein, "vessel" may refer to a truck, a truck trailer, a railroad car, a pod, a container for transport in a cargo ship, a boat, a plane, a storage space, a warehouse, a building, a room and the like.

Forklifts may include lifting forks spread 65.5 inches wide, leaving 10.75 inch over hang on both sides. This may allow the load to be balanced in the center of the module. Once the module is lifted on a motorized forklift device, it may be placed on a trailer lift. The trailer lift may be designed to facilitate placing the rollers on the module directly onto the tracks the lift. Once the lift becomes flush with the inside of a trailer, the module may be slid onto the tracks inside the trailer A retention plate on the lift platform may prevent the module from rolling off during lifting.

A trailer may be fully loaded with modules in accordance with the principles of the invention, and the trailer may then begin transport. Optionally, the trailer may be taken to a cargo station or distribution hub which may have tracks for sliding modules in and out of trailers rapidly.

In one embodiment, a transport module having a front, a back, a top, a base and two sides. Each of the components are removably attached to one another such that the module may be disassembled. The front may be comprised of one or more doors which may slide into grooves or may be rotatably attached to the sides, the top, or the base. The base may have two channels for engaging the prongs of a forklift or similar device. The base may also include recessed wheels capable of engaging tracks on a surface to facilitate sliding movement of the module.

In another embodiment, a transport method includes providing a vessel having tracks capable of engaging the recessed wheels of a module. A modules may be inserted into the vessel by placing the module on tracks such that recessed wheels engage the tracks to facilitate sliding movement of the module.

In another embodiment the transport method uses a forklift to place the module on a lift platform having tracks. The module is then elevated on the lift platform so that is it flush with the interior of the vessel and the tracks on the platform align with the tracks in the vessel. The module may then be slid off of the platform and into the vessel.

In another embodiment, the transport method includes sliding the module out of the vessel and into a distribution center and sliding the module into a different vessel at the distribution center.

In another embodiment, a plurality of modules are loaded into a vessel such that they each substantially abut adjacent modules in the vessel.

It is therefore an object of the present invention to provide a system for transporting and/or storing objects by loading them into modular vessels that utilize tracks engaging recessed wheels on the module to slide the modules into a storage space such that each module substantially abuts the interior walls of the vessel and adjacent modules.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 17 is a front view of an alternative embodiment of a transport module engaged with tracks in accordance with the principles of the invention;

FIG. 18 is a perspective view of an alternative embodiment of a transport module engaged with a track in accordance with the principles of the invention;

FIG. 19 is another perspective view of an alternative embodiment of a transport module engaged with tracks in accordance with the principles of the invention;

Figure 36:
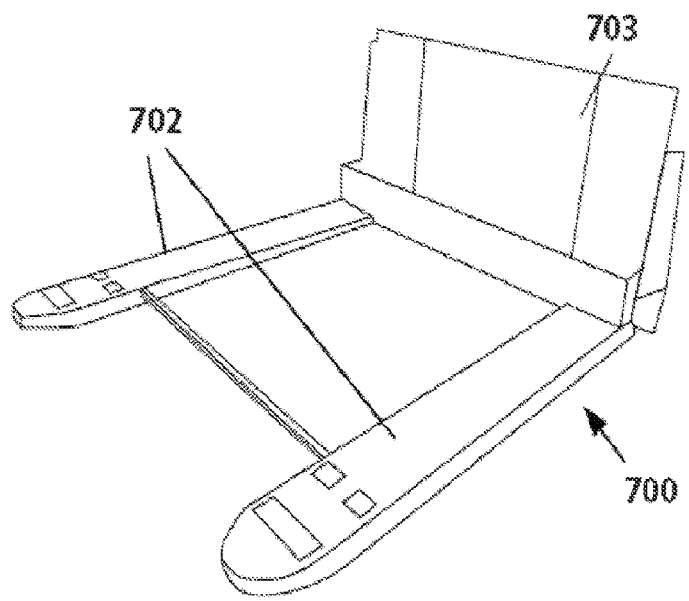
FIG. 36 is a perspective view of a forklift Jack in accordance with the principles of the invention.
Figure 40:
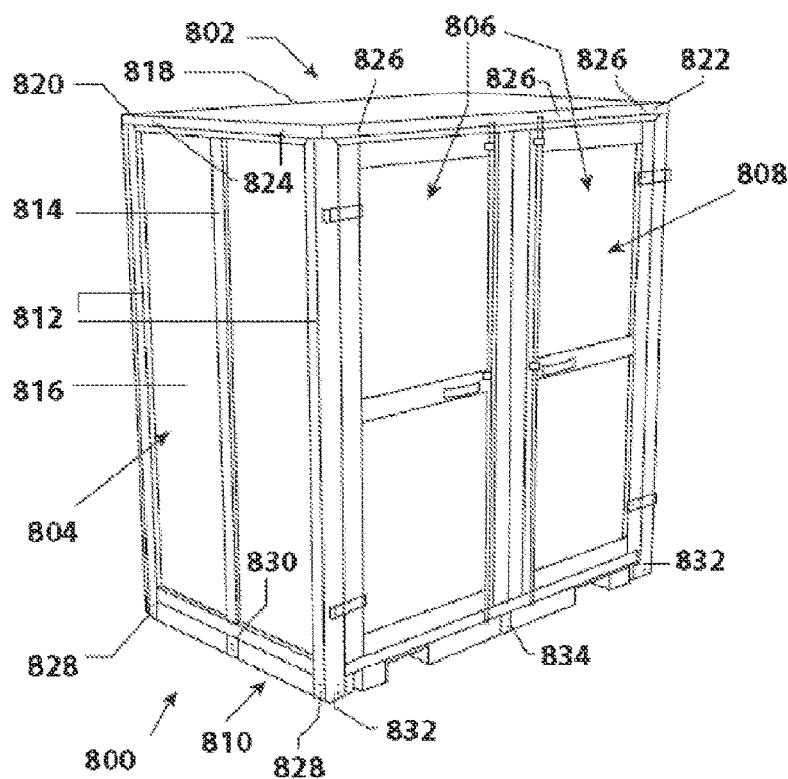
FIG. 40 is a perspective view of an alternative embodiment of a transport module in accordance with the principles of the invention.
Figure 42:
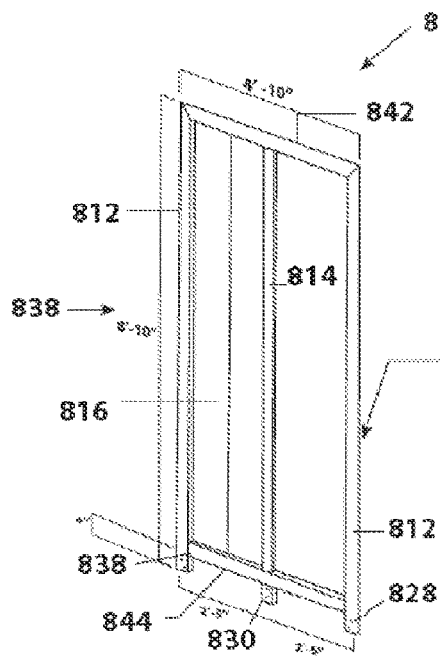
Figure 43:
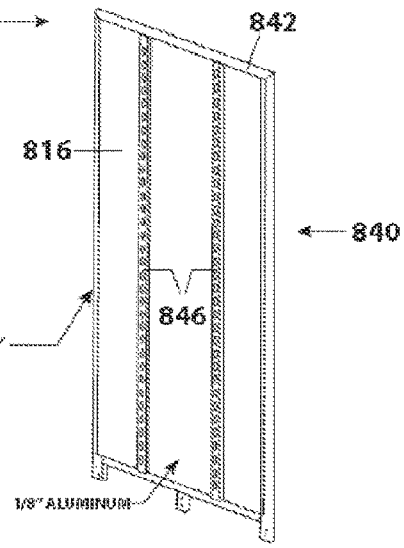
Figure 44:
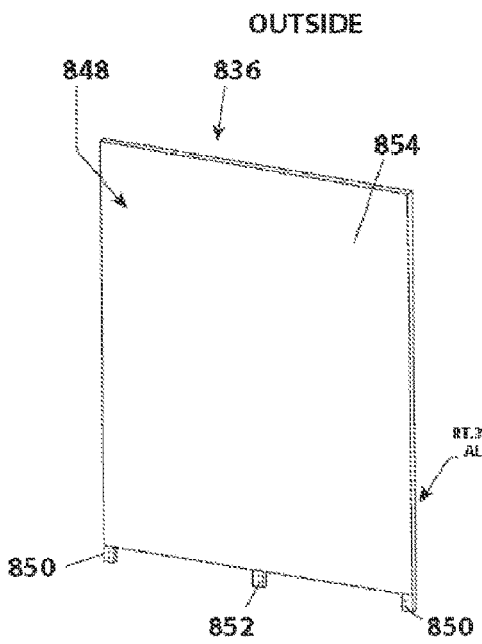
Figure 45:
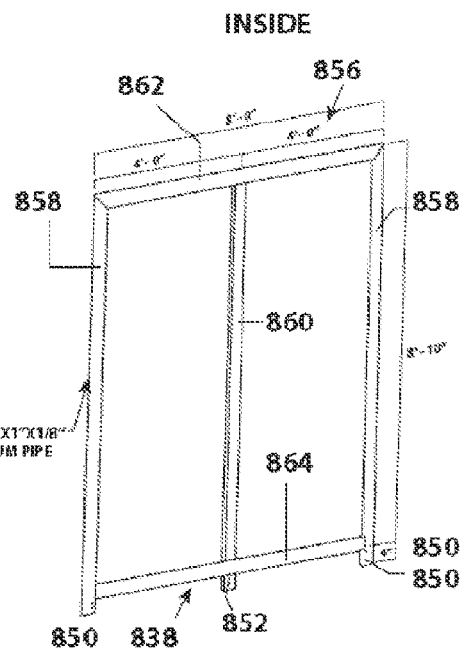
Figure 48:
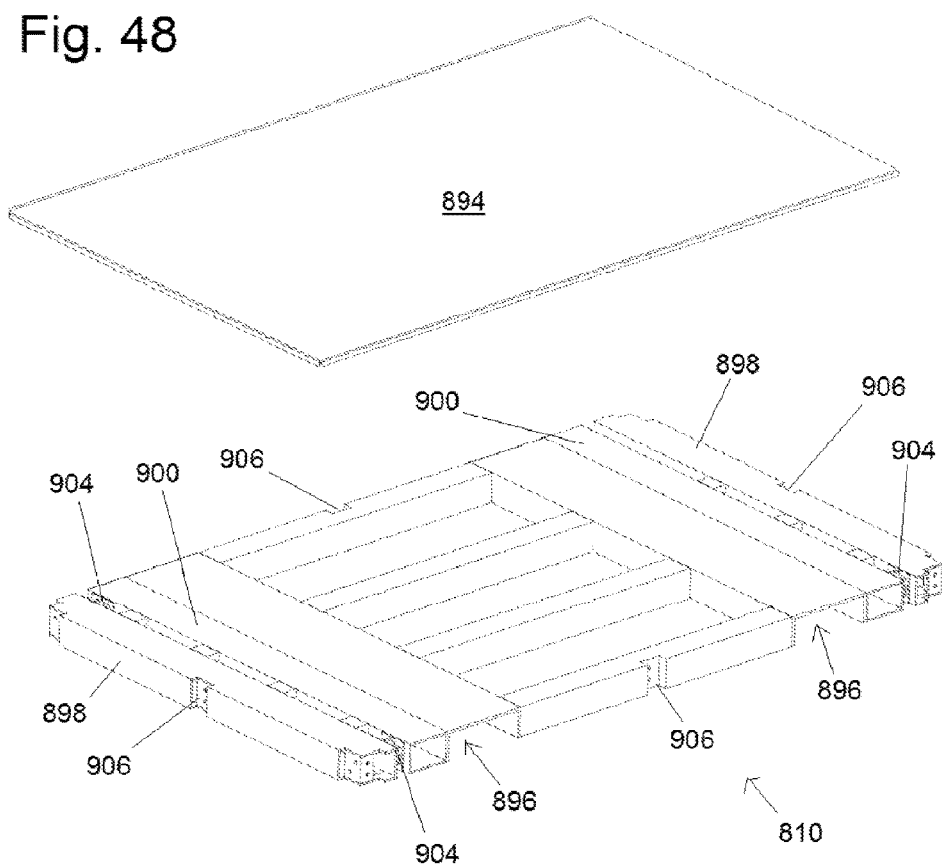
Figure 50:
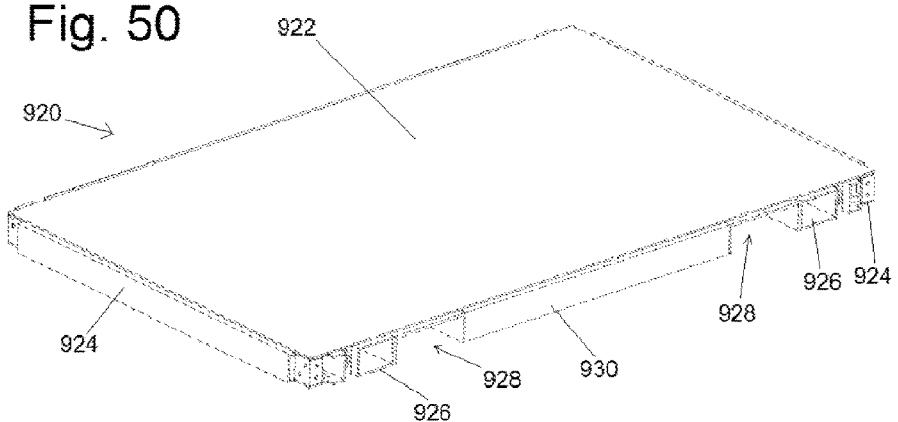
Figure 51:
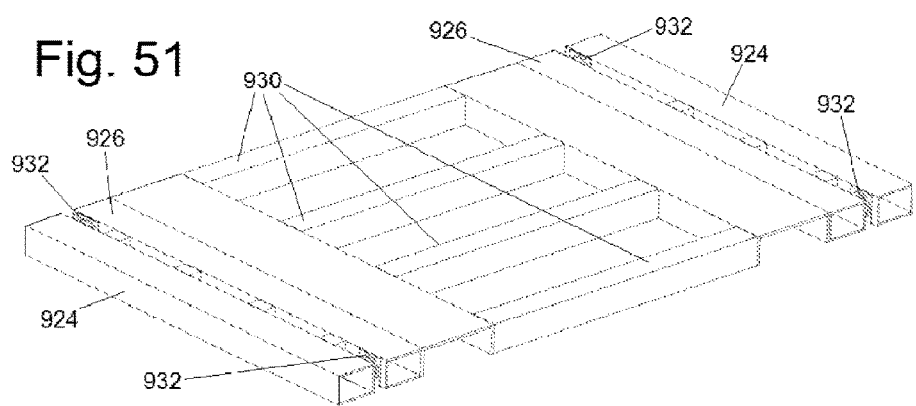
Figure 52:
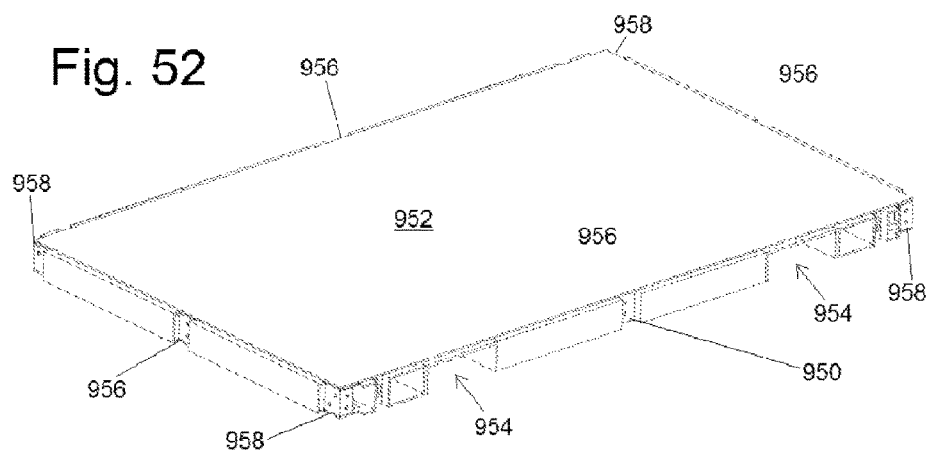
Figure 53:
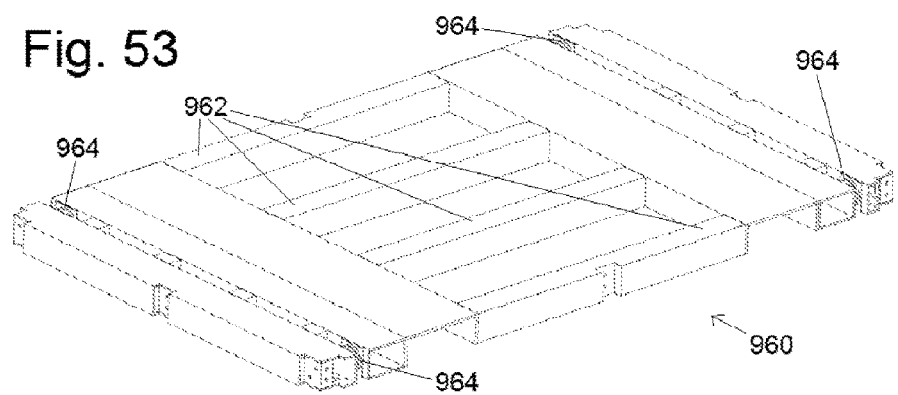
Figure 52A:
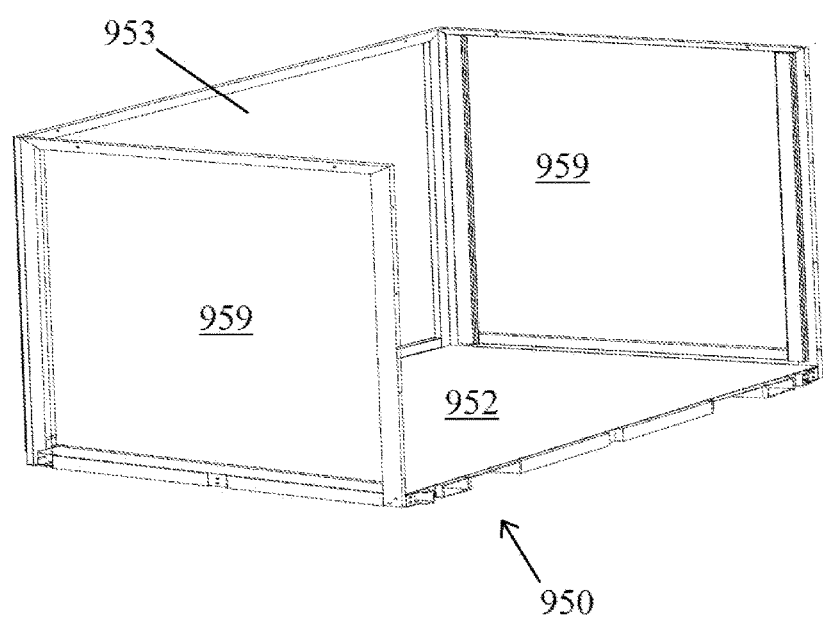
Figure 54:
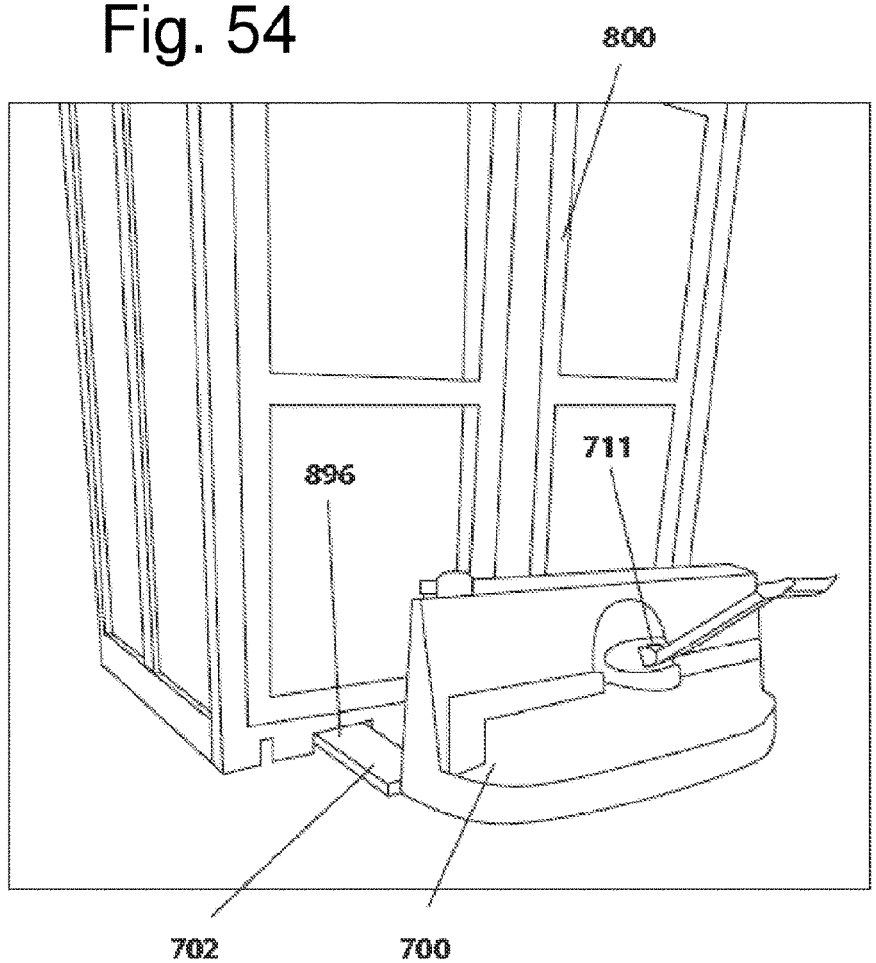

41 is an exploded view of an alternative embodiment of a transport module in accordance with the principles of the invention;

FIG. 42 is a perspective view of the outside of a sidewall of an alternative embodiment of a transport module in accordance with the principles of the invention;

FIG. 43 is a perspective view of the inside wall of an alternative embodiment of a transport module in accordance with the principles of the invention;

FIG. 44 is a perspective view of the outside of a rear wall an alternative embodiment of a transport module in accordance with the principles of the invention;

FIG. 45 is a perspective view of the inside wall of an alternative embodiment of a transport module in accordance with the principles of the invention;

FIG. 46 is a perspective view of the inside of the front of an alternative embodiment of a transport module in accordance with the principles of the invention;

FIG. 47 is a perspective view of the outside of the front of an alternative embodiment of a transport module in accordance with the principles of the invention;

FIG. 48 is an exploded perspective view of a base of an alternative embodiment of a transport module in accordance with the principles of the invention;

FIG. 49 is a perspective view of the top of an alternative embodiment of a transport module in accordance with the principles of the invention;

FIG. 50 is a perspective view of a pallet in accordance with the principles of the invention;

FIG. 51 is a perspective view of a pallet in accordance with the principles of the invention;

FIG. 52 is a perspective view of a pallet in accordance with the principles of the invention;

FIG. 52a is a perspective view of a pallet in accordance with the principles of the invention;

FIG. 53 is a perspective view of a pallet in accordance with the principles of the invention;

FIG. 54 is a perspective view of the transportation Module of FIG. 40 engaged with the forklift jack of FIG. 36.

DETAILED DESCRIPTION

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The present invention provides a system for transportation, consolidation and storage of all types of cargo or movable objects, including cargo such as is commonly found in residential relocations and household goods transportation. The system may reduce cost, including labor cost.

In one embodiment, a transport module may be 8 ft. wide, 8.9 ft. high and 5 ft. deep. The transport module may be disassembled and reassembled during transportation when not in use. The module may have two swing doors, sliding doors, removable doors or other mechanisms for accessing the interior of the module for easy access once the module is assembled and placed on the ground. The module may be designed to fit in a rail container having dimensions of 9.08 feet high and 8.1 feet wide. A system for transporting or storing items may use the modules that may fit in a rail trailer or a regular trailer leaving 1 inch on both sides and the top. This may allow 10 modules to fit into one 53 foot container. This may increase efficiency of cross-country transportation.

The base of a module may have 4 or 6 (or more) roller wheels. Trailer and rail containers may be specifically built with, or retrofitted to include, tracks installed on their floors to engage the wheels of a module. The tracks may extend about 1 inch from the floor and have a similar width to that of the module's rollers. The rollers may be flush with the base of a module or recessed such that when the container sits on a floor, it will not roll away. The only time the container will roll may be when the rollers engage tracks designed to engage the rollers or wheels. This may allow an operator to load the cargo cube containers with 1 inch on both sides and the top and preventing human errors. As used herein, "roller" and "wheel" may be used interchangeably. As used herein, "vessel" may refer to a truck, a truck trailer, a railroad car, a pod, a container for transport in a cargo ship, a boat, a plane, a storage space, a warehouse, a building, a room and the like.

Forklifts may include lifting forks spread 65.5 inches wide, leaving 10.75 inch over hang on both sides. This may allow the load to be balanced in the center of the module. Once the module is lifted on a motorized forklift device, it may be placed on a trailer lift. The trailer lift may be designed to facilitate placing the rollers on the module directly onto the tracks the lift. Once the lift becomes flush with the inside of a trailer, the module may be slid onto the tracks inside the trailer A retention plate on the lift platform may prevent the module from rolling off during lifting.

A trailer may be fully loaded with modules in accordance with the principles of the invention, and the trailer may then begin transport. Optionally, the trailer may be taken to a cargo station or distribution hub which may have tracks for sliding modules in and out of trailers rapidly.

Figure 1:
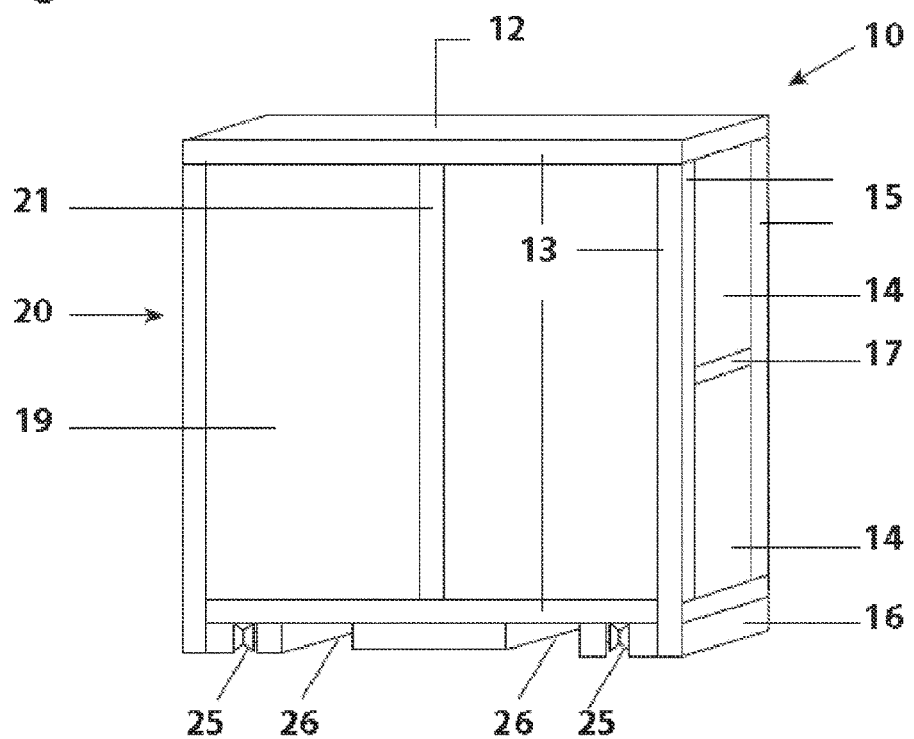
FIG. 1 is a perspective view of a transport module in accordance with the principles of the invention.

FIG. 1 shows a parallelepiped transport module 10 in accordance with the principles of the invention transport module 10 may include a base 16, two side walls 11, a rear wall 20 and a top 12. The side walls 11 may include a panel 14, one or more peripheral beams 15 about its perimeter and a transverse beam 17.

In the exemplary embodiments used to describe the principles of the invention, the modules 10 may be generally parallelepiped. That is, they typically may be shown as having the geometry of a cube or rectangular prism. However, other geometrical shapes may be used. For example, if a transportation vessel or other shipping vessel or a storage unit has a different geometry, a module may be designed to accommodate and snugly fit within that vessel or unit. As will be explained more fully below, one of the advantages provided by the principles of the invention is efficient use of space. That is, the module may be sized to fit very snugly within a vessel and adjacent to other modules. The use of the tracks and modules allows for quick and accurate placement of the modules in very close proximity, maximizing use of space and minimizing labor. The principles of the invention may allow a module to substantially abut the floor, ceiling, sides, front and back of a compartment into which it is placed.

As used herein, "beams" refers generally to an elongate structural component imparting strength or support to a structure and may be used interchangeably with the terms such as struts, stanchions, mullions, lintels, tansoms, girders, joists and the like. In the embodiment shown, beams are typically hollow parallelepiped metal constructions, often referred to as "metal tubing." However, the beams may be comprised of any number of materials, including would, carbon fiber, plastics, or other materials capable of strengthening the structure of a module.

Beams 15 and 17 may provide structural support, as well as points of removable attachment mechanisms between various components of a transport module 10. The rear wall 20 may include one or more panels, 19, peripheral beams 13 and a mullion 21. As will be explained in more detail below, the base 16 may include recessed wheels 25 or other devices for providing sliding movement and may also include channels 26 to accommodate the forks of forklifts, forklift jacks and similar devices.

Figure 2:
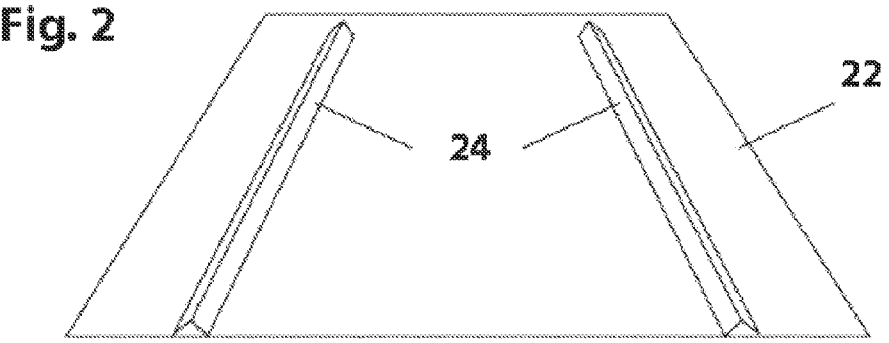
FIG. 2 is a platform having tracks in accordance with the principles of the invention.

FIG. 2 shows a platform 22 having a pair of substantially parallel tracks 24. As used herein, "tracks," "rails," "angle irons" all may generally refer to tracks for use in providing slidable engagement with the floor, and optionally the sides and the top of a transport module. While the present invention is generally described using V-shaped tracks, other slidable engagement systems may be suitable and should be regarded as substantially equivalent so long as they provide adequate slidable engagement and movement of the module.

Each of the tracks 24 may have an inverted V shape, sometimes referred to as an angle iron, and may be designed to slidably engage recessed wheels 25. Inverted V shaped tracks have been used with grooved wheels for a variety of purposes to facilitate sliding longitudinal movement. A slidable movement mechanism using an inverted V track in a grooved wheel may be most commonly used for sliding metal gates found restricting access to parking lots, neighborhoods, and the like. Platform 22 may be a permanent structural feature of a floor, for example the floor of a storage space, the interior floor of a trailer used to ground transportation, the floor of a railway car, the floor of an airplane and/or the floor of a boat or other vessel. Optionally, platform 22 may be removably affixed to any of the floors mentioned above or other surface. It may be advantageous for platform 22 to be attachable to an existing floor, such that it may retrofit transportation vessels, storage compartments, warehouses, distribution centers and the like to accommodate many of the principles of the invention.

Optionally, the inverted V shaped tracks 24 may be installed, permanently or removably, onto any of the surfaces mentioned above, or any other surface on which it may be desirable to traverse module 10 across. Optionally, each of the inverted V-shaped tracks 24 may be located on its own platform. The tracks and/or platforms, may be attached to a surface by any suitable means. It may be desirable to provide the tracks as a plurality of relatively short units. The number of units aligned and installed may depend on the size of the surface. The use of such standardized tracks may increase efficiency and ease of use of the principles of the invention.

Figure 3:
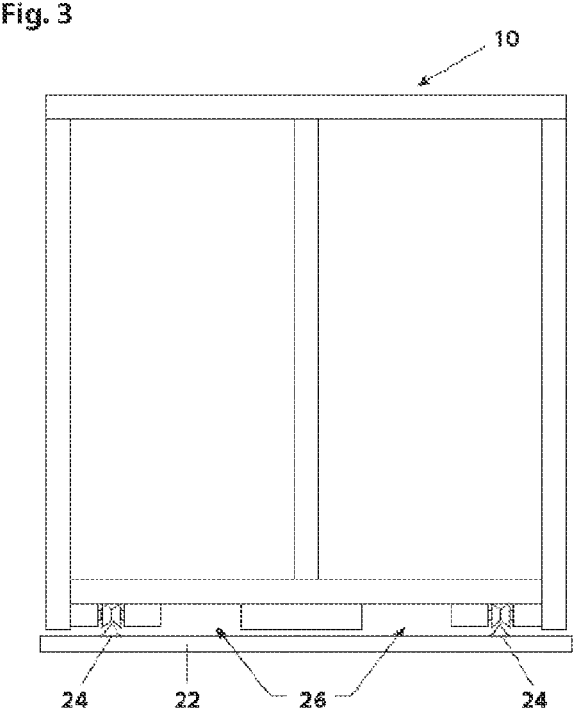
FIG. 3 is a front view of a transport module engaged with tracks in accordance with the principles of the invention.

FIG. 3 shows a module 10 placed on a platform 22 having the tracks 24 comprising an angle iron having an inverted V-shaped rail. The wheels 24 may include a central inverted V-shaped groove. The use of the inverted V-shaped groove in the wheels 25 and corresponding rail allow the transport module 10 to be slid along the rail without coming loose. Optionally, other railing systems may be used. For example, a plurality of wheels, bearings or rollers may be placed used. It may also be desirable to use tracks that have a square or rectangular cross-section and engage wheels that do not have a groove but are recessed.

A grooved wheel and angle iron system, or other track system may be used in a plurality of situations to facilitate transportation of the transport modules 10. A large warehouse or distribution center may include similar tracks and may allow transport modules to be moved from one track to another by means of forklifts, forklift jacks or similar devices. When the transport modules are engaged with a track, the amount of force needed to move them along the track is substantially less than what is otherwise required to life the transport module. Thus human operators may be able to manipulate transport modules on tracks without the use of machinery to provide necessary force.

The channels 26 may be used to engage the prongs of a forklift, thereby allowing the module 10 to be lifted off of and removed from the tracks 24. A forklift jack or similar device may be used to place the module 10 upon the platform 22. The prongs of a forklift may engage the module 10 by being placed within the channels 26.

Figure 4:
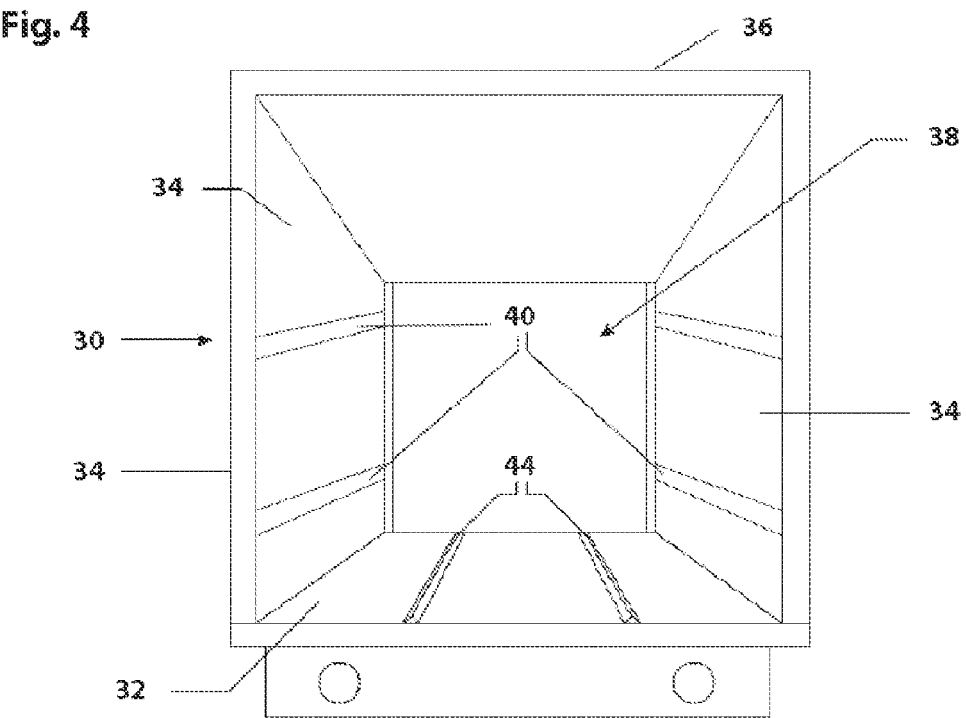
FIG. 4 is a perspective view of a trailer having tracks in accordance with the principles of the invention.

FIG. 4 shows a shipping trailer 30 for use in accordance with the principles of the invention having a floor 32, sidewalls 34 and a top 36, which together form storage space 38. E tracks 40 may optionally be located on the interior of the walls 34. Trailer 30 may be a typical trailer used with a truck and trailer system, a package car, a pod, standardized containers used in sea transport, airplanes and railroad cars. Trailer 30 may have tracks 44, removably affixed to its floor 32.

A transport module may be sized in order to fit with in storage space 38 snugly. In some instances, there may be as little as a half inch between the sides and top of the transport module and the interior walls of the trailer 30. Thus, the transport module may maximize efficient use of available storage space. The trailer 30, once loaded with transport modules, may then be transported anywhere desired.

Figure 5:
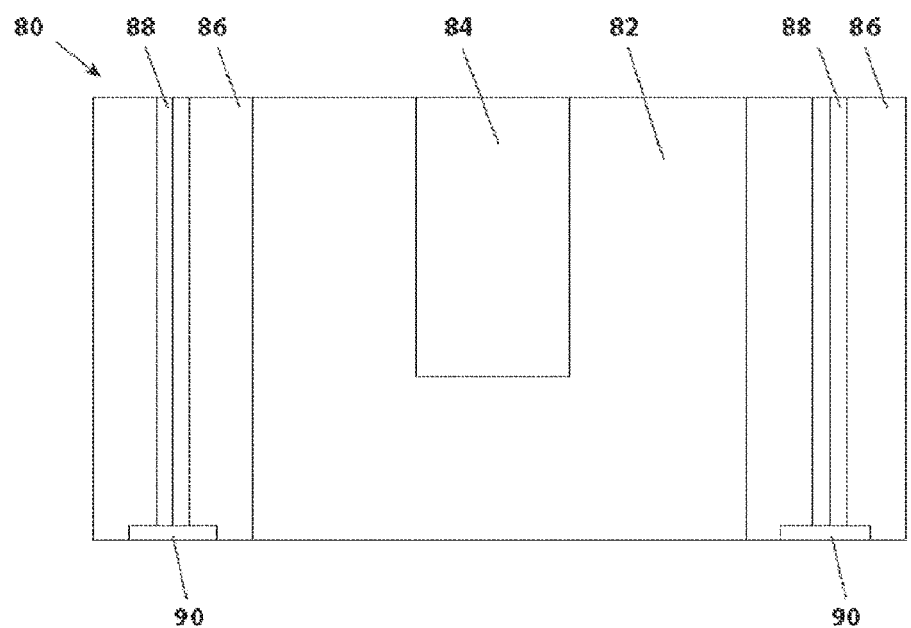
FIG. 5 is a top plan view of a trailer lift having tracks in accordance with the principles of the invention.
Figure 6:
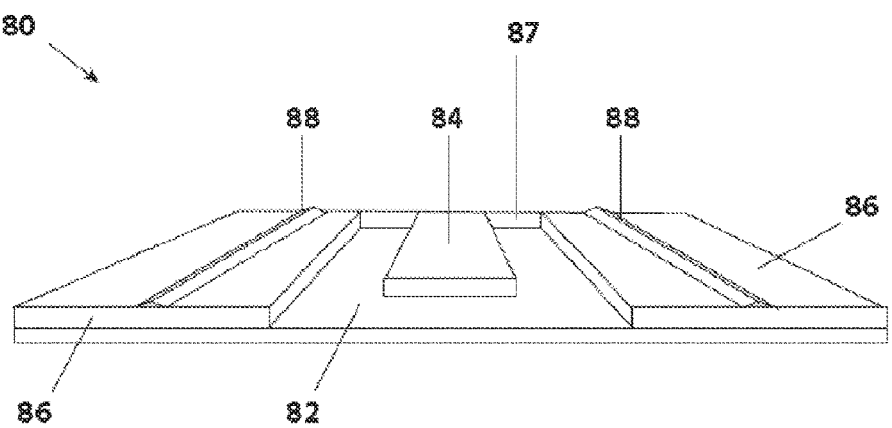
FIG. 6 is a perspective view of a trailer lift having tracks in accordance with the principles of the invention.

FIGS. 5 and 6 show a lift platform 80 in accordance with the principles of the invention. Lift platform 80 may include a base plate 82 and two support plates 86. Each support plate 86 may have a track 88 extending the length of the platform 80. Retention plates 90 may be located at the distal ends of each of the tracks 88. An alignment plate 84 may also be included. The tracks 88 may be positioned such that they may engage the grooved wheels 25 located on the base 16 of a transport module. The space between support plates 86 and alignment plate 84 may correspond to the pallet jack channels 26 of the base 16 of the module 10. This may assist in properly aligning a transport module such that the grooved wheels 25 may be placed properly, upon tracks 24.

A trailer lift may be retrofitted and converted into a platform 80 for use with the present invention. Support plates 86 having tracks 88 and retention plates 90 may be attached to an existing trailer lift platform. An alignment plate 84 may also similarly be attached to an existing platform. In this manner, platforms on existing trailer lifts may be retrofitted to accommodate transport modules of the present invention.

Figure 7:
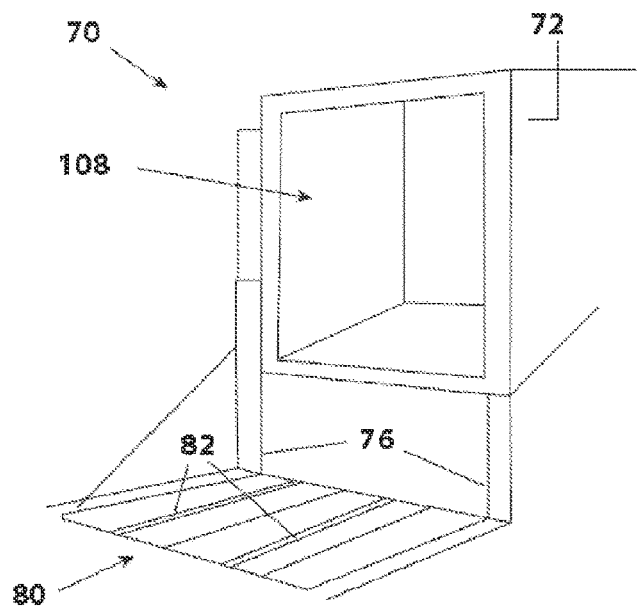
FIG. 7 is a perspective view of a trailer lift having tracks and a trailer having tracks in accordance with the principles of the invention.

FIG. 7 shows a trailer lift 70 having a platform 80 for use in accordance with the principles of the invention. Trailer lift 70 may be affixed to the back of a trailer 72. Arms 76 may be lowered and the platform 80 may be pivoted downward such that it is horizontal with the ground. Platform 80 may also be pivoted upward such that it is parallel with the arms 106 during transport of the trailer.

Figure 8:
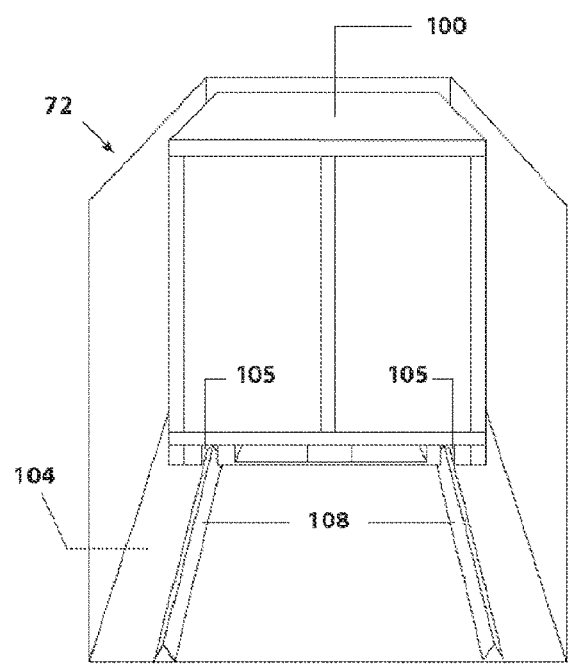
FIG. 8 is a perspective view of a transportation module in a trailer in accordance with the principles of the invention.

A module may be placed upon the platform 80 by means of a forklift. Optionally, a module may be slid onto the platform 80. By aligning the tracks 82 on platform 80 with tracks on another surface. Once the module is on the platform 80, the platform 80 may be raised until it is flush with the interior of a trailer 72. The transport module 10 may then be slid into the trailer 72, the wheels 105 engaging tracks 108, as shown in FIG. 8. The use of wheels and tracks or other similar sliding mechanism may allow even very heavy transport modules to be slid in and out of trailer 128 with relative ease.

FIG. 8 shows a module 100 placed inside a trailer 102. Once a lift platform 80 raises a module 100 such that the platform 50 is flush with the floor of the trailer 72 and its tracks 82 align with tracks 108, the module 100 may be slid onto tracks 108 and into the trailer 102. When a module, such as module 10 in FIG. 1 or module 100 in FIG. 8, lies on a flat surface such as a floor or the ground, the recessed, grooved wheels 25 or 105, respectively, may not touch the ground at all, or may optionally not sufficiently impinge upon the surface to facilitate rolling of the module. When a module is placed on tracks, the recessed, grooved wheels and the tracks engage, thereby facilitating sliding movement of the module by means of relatively little force. Typically, a single person may be capable of exerting sufficient force to cause a module to slide along tracks. Because a module remains on the tracks, by nature of the retaining engagement of a V-shaped track and a recessed wheel, a module may be slid into the space into which it fits very snugly, substantially abutting the walls of the container into which it is place. A module may optionally include handles which an operator may grab when sliding a module along tracks.

Figure 9:
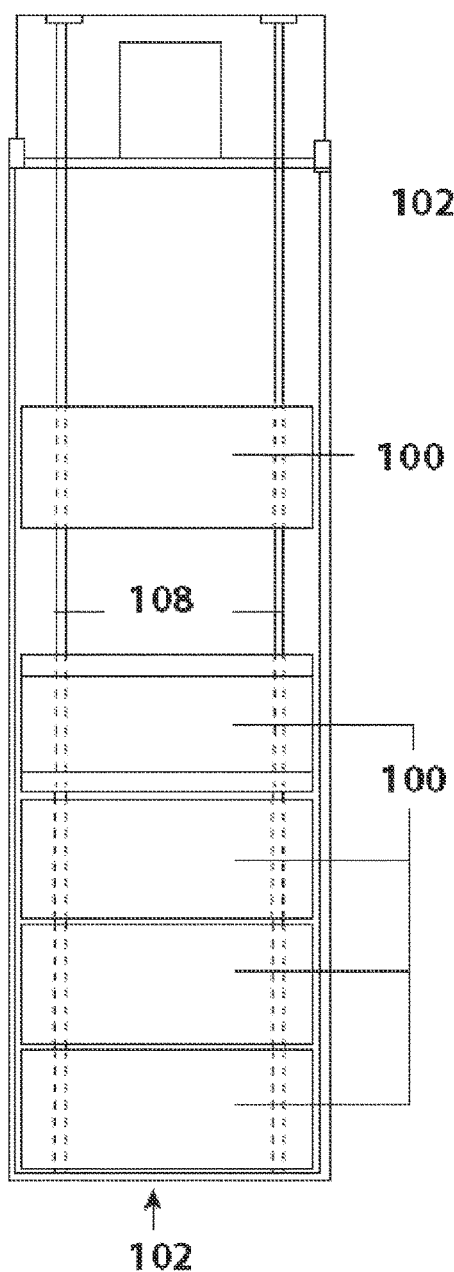
FIG. 9 is a top cross-sectional view of trailer having a trailer lift and a plurality of transportation modules in accordance with the principles of the invention.
Figure 10:
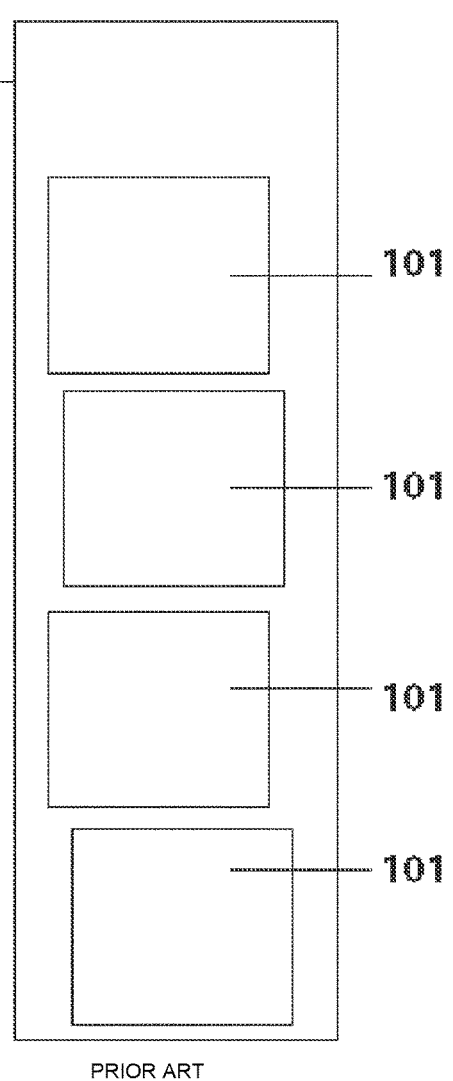
FIG. 10 is a top cross-sectional view of trailer of the prior art.

FIG. 9 shows a trailer 102 having a lift platform 50. A plurality of modules 100 have been lifted by platform 50 and inserted into trailer 102. The modules 100 may then slidably engaged tracks 108. As may be seen, the modules 100 may be slid into trailer 102 such that they are but one another as well as the walls of the trailer 102. FIG. 10 shows trailer 102 without tracks 108 and modules 100. Without the use of tracks 108 and the modules 100 which engage the tracks 108, storage containers 101 may only be placed haphazardly and inefficiently. Containers 101 may be comprised of a pallet having objects stacked upon it. Because, pallets, may only be transported using a forklift or forklift Jack, they are not capable of being inserted into a container having a very snugly fit. Forklifts generally require extra space. Furthermore, items stored on pallets may be susceptible to falling over and damage during transport. The modules 100 firmly retaining objects inside them, preventing damage.

Figure 11:
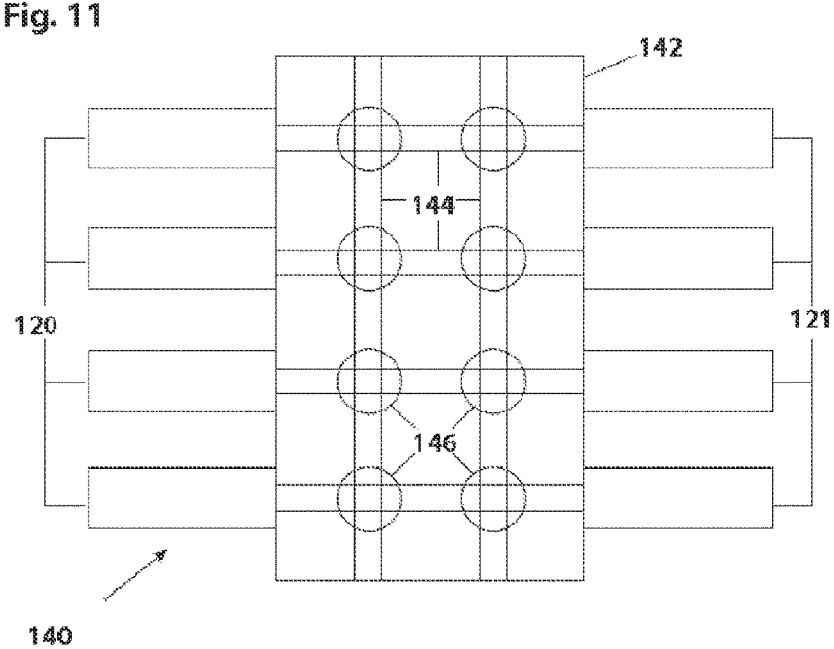
FIG. 11 is a diagram of a distribution center in accordance with the principles of the invention.

FIG. 11 shows a diagram of a distribution hub 140 in accordance with the principles of the invention. Several trailers 120 may be docked to a building 142. Each of the trailers may come from a particular location. Shipping vessels 121 may also be docked to the hub 140. Shipping vessels 121 may be rail cars or other vessels. The building 142 may include a system of rails 144 and may also optionally include one or more turntables 146. The track system used in the present invention primarily allows sliding of modules along a single axis. By incorporating turntables 146 into a distribution center, modules may be quickly and easily removed from one trailer and placed in another. Because the tracks facilitate movement of the modules with relatively little force, forklifts may not be required for moving the modules. As a result, moving modules from one trailer to another, and thus distribution of goods in general, may be accomplished using less time, less labor, and less effort. Shipping or transportation costs may therefore be significantly reduced.

Figure 12:
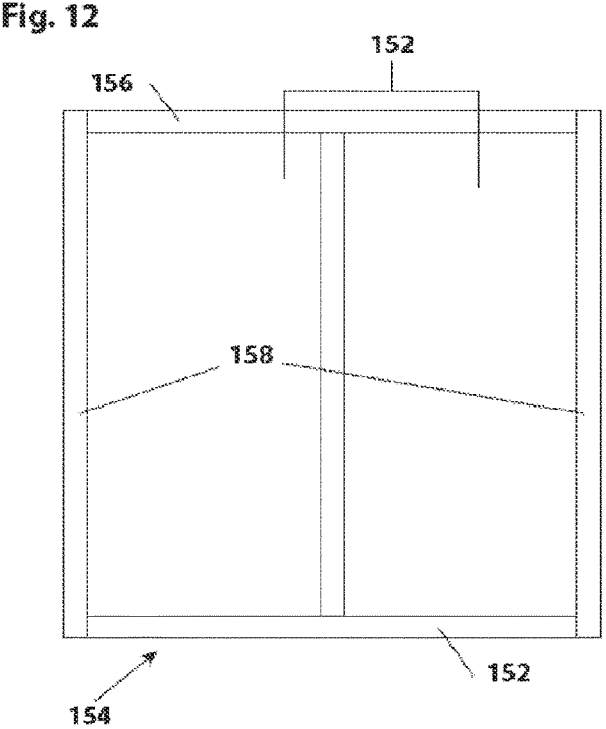
FIG. 12 is a front view of a door for a transportation module in accordance with the principles of the invention.

FIGS. 12 to 17 show components of an embodiment of a module 150. FIG. 12 shows a door 154 for attachment to the open side of a transport module 10 as shown in FIG. 1. Door 154 may be constructed in a similar or substantially equivalent manner as the other components of a transport module 10. In this embodiment, a steel panel 152 may include reinforcing beams 156 and struts 158. These may be comprised of 4×6 steel tubing. Beams 156 and struts 158 may be welded or bolted to each other and to panel 152.

Figure 13:
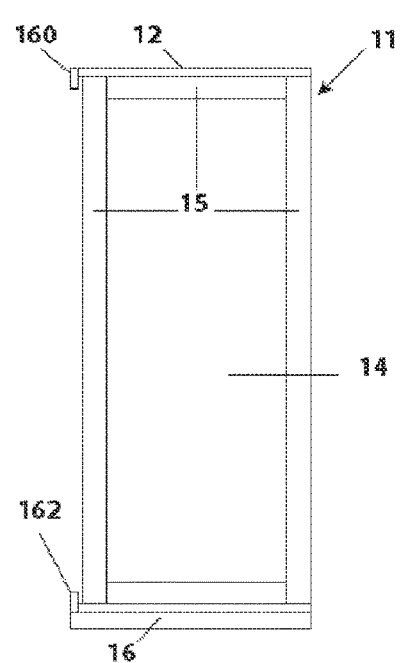
FIG. 13 is a side view of a transportation module in accordance with the principles of the invention.

FIG. 13 shows a side view of a transport module 10. The side panel 11 may be comprised of a panel 14 and beams 15 about its perimeter. Top 12 may be removably affixed to the top of side panel 11. Top 12 may include a lip 160 extending downward from top 12 on the open side of the transport module 10. Similarly, lip 162 may extend upward from the base 16 on the open side of the transport module 10. Lips 160 and 162 may provide grooves into which the door 154 may be placed. Lips 160 and 162 may assist in firmly retaining the door 154 on module 10.

Figure 14:
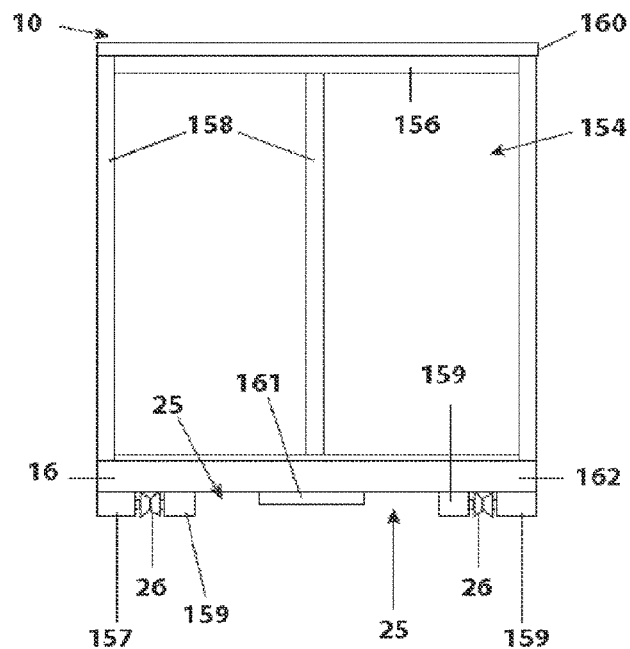
FIG. 14 is a front view of a transportation module in accordance with the principles of the invention.

FIG. 14 shows the front of a transport module 10 having a door 154 secured thereto. Lips 160 and 162 may hold the door in place. Beams 156 and struts 158 may be partially covered by lips 160 and 162. Also visible in FIG. 14 are additional components of the base 16. Base 16 may have two distal beams 157 that run along the sides of base 16. Medial beams 159 may be located medial to beams 157, i.e. more proximal to the center of the base 16. Beams 157 and 159 form two channels, one on each side of the base 16. These channels may contain grooved wheels 26. Beams 157 and 159 and grooved wheels 26 may be sized such that wheels 26 do not protrude downward further than beams 157 and 159, such that grooved wheels 26 do not substantially engage a floor or other surface.

Base 16 may also include an alignment panel 161. The alignment panel 161, along with medial beam 159 may form pallet jack channels 25. Pallet jack channels 25 may extend the entire width of the base 16 in order to provide a suitable location for engagement with a pallet jack, forklift or other similar device.

Figure 15:
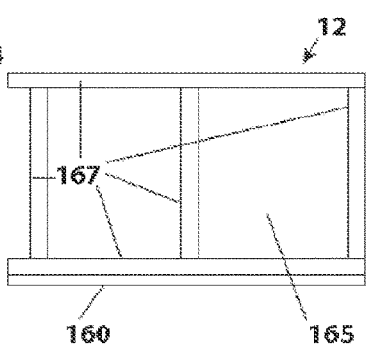
FIG. 15 is a top plan view of a transportation module in accordance with the principles of the invention.

FIG. 15 shows the top 12 of the storage module 10. Top 12 may be comprised of a panel 165 and a plurality of beams 167. Lip 160 may also be attached to top 12. As with the other components of the transport module 10, the panel 165 and beams 167 may be comprised of steel or other suitable material and may be removably attachable to the other components of the module 10.

Figure 16:
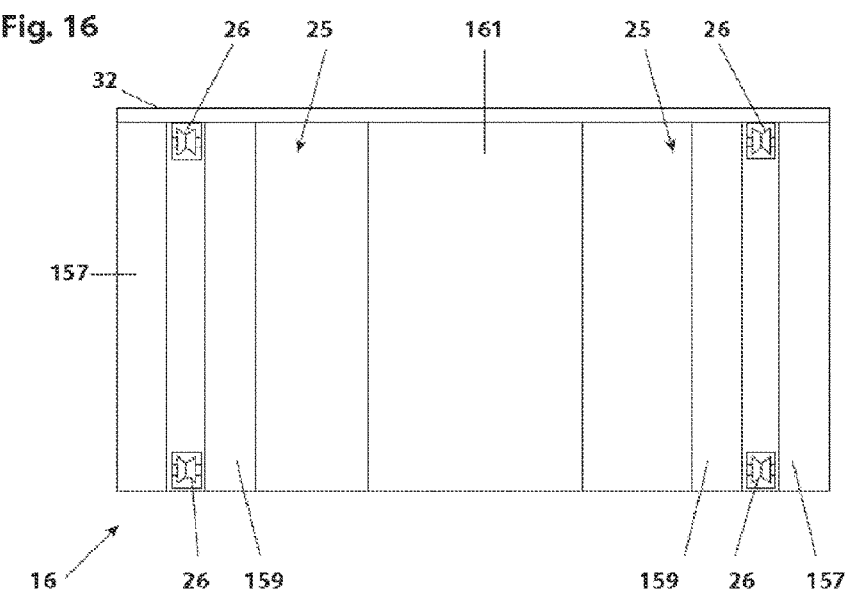
FIG. 16 is a bottom plan view of a transportation module in accordance with the principles of the invention.

FIG. 16 shows a bottom view of the base 16. In this Figure, pallet jack channels 25 may be seen between alignment panel 161 and medial beams 159. In this embodiment, for grooved wheels 26 are placed between distal beams 157 and medial beams 159, two in each channel formed by the beams 54 and 56. Optionally, additional grooved wheels 26 may be used. It may be desirable to used additional wheels 26 placed between the distal beams 157 and medial beams 159.

FIG. 17 shows a transport module 10 placed on a platform 80. For clarity, the retention plates are not shown. A forklift Jack or similar device may be used to place the module 10 upon the platform 80. The prongs 110 of the forklift may automatically align due to the placement of alignment plate 161, alignment plate 85, and medial beam 159. The guiding of the prongs 110 may assist in properly aligning wheels 26 with tracks 88. In the embodiment shown in figures, the tracks 88 consist of an angle iron having an inverted V-shaped rail. The wheels 26 may include a central the inverted V-shaped groove. The use of the inverted V-shaped groove in the wheels 60 and corresponding rail allow the transport module 10 to be slid along the rail without coming loose. Optionally, other railing systems may be used. For example, a plurality of wheels, bearings or rollers may be placed in a track 88. While a protrusion on the base of the module may be designed to slidably engage the wheels, bearings or rollers. The angle iron may be easily attached to and removed from a platform.

FIGS. 18 and 19 show an alternative embodiment of a transport module 250 having a top 252 and sides 254. Shipping module 250 may usually include a floor panel that may have a rubber coating or other material to protect objects stored within it. The floor panel has been removed in FIGS. 18 and 19 to better illustrate slots 258 into which forklift prongs may enter. In these embodiments, slots 258 are comprised of steel tubing that may completely surround a forklift prong. It may be preferable for slots 258 to be open on the bottom in order to more easily allow forklift prongs to disengage a transport module by lowering once a transport module has been placed on a platform and its wheels have engaged tracks on the platform. A plurality of crossbeams 256 may provide support, structure, and/or stability for the transport module 250. Crossbeams 256 may operate in a manner similar to joists. Wheels 260 may engage tracks 262. In this embodiments, the wheels 260 may be grooved wheels and the tracks 262 may be angle irons having an inverted V shape.

Figure 20:
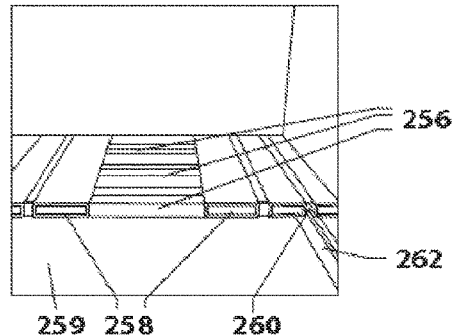
FIG. 20 is a view of a base of an alternative embodiment of a transport module engaged with tracks in accordance with the principles of the invention.

FIG. 20 shows an enlarged view of the crossbeams 256 and the slots 258. In this embodiment, four crossbeams 256 extends between two slots 258. More or fewer cross beams 256 may be optionally used. There may preferably be very little distance between the floor 259 and the slots 258 and crossbeams 256 which form the base of a transport module 250. Preferably, the top, sides and base of a transport module may all be substantially flush with the interior sides of a trailer or other shipping device, such as a plane, ship, package car, pod, or the like. In some embodiments, there may be less than ½ inch leeway between the surfaces of a transport module and the services of the interior chamber to which they are placed. This may maximize efficiency when transporting products.

Figure 21:
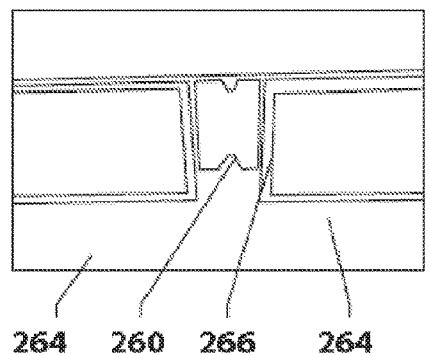
FIG. 21 is an enlarged view of a recessed wheel on the base of an alternative embodiment of a transport module in accordance with the principles of the invention.

FIG. 21 shows an enlarged view of a grooved wheel 260. Axel 266 extends through the access of grooved wheel 260 and may be anchored in steel tubing 264. This design may minimize the number of parts. In this embodiments, grooved wheel 260 has a diameter small enough that the circumference of the wheel 260 may not extend beyond steel tubing 264. Because the wheels 260 reside entirely within the channel formed by steel tubing 264, the transport module may not freely roll unless it is placed upon tracks, which may be engaged by the wheels 260. This may also prevent damage to the wheels 260.

Figure 22:
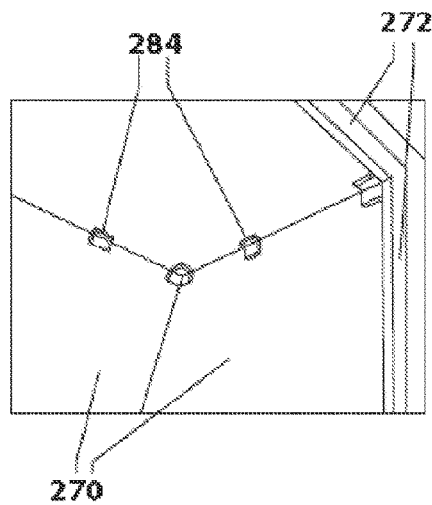
FIG. 22 is a perspective view of the interior of an alternative embodiment of a transport module in accordance with the principles of the invention.

FIG. 22 shows the interior of a transport module 250 comprised of panels 270 and beams 272. A plurality of brackets 274 may be used to removably engage the components of a transport module to one another. Each of the brackets 274 may be permanently affixed to one panel and removably securable to a second panel by means of bolts, screws, or other attachment mechanisms. By allowing a transport module to be disassembled into its component parts, specifically a top, sides, front, back and base which are all substantially flat and planar, the transport module itself may be broken down and shipped or stored more conveniently when not in use.

Figure 23:
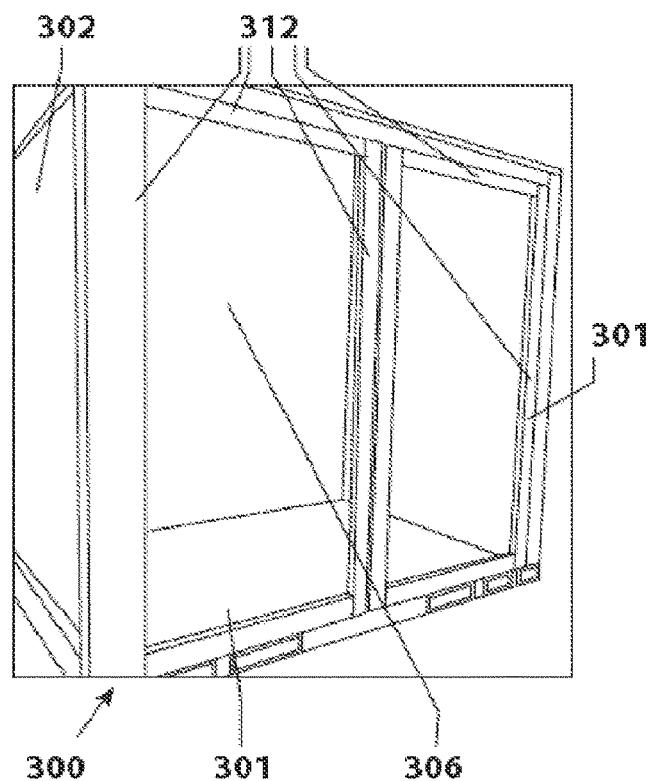
FIG. 23 is a perspective view of an alternative embodiment of a transport module in accordance with the principles of the invention.
Figure 24:
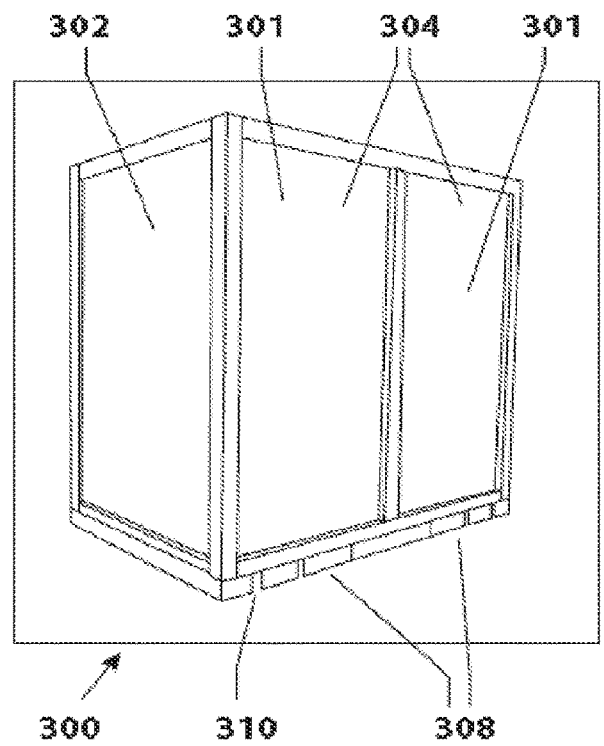
FIG. 24 is another perspective view of an alternative embodiment of a transport module in accordance with the principles of the invention.

FIGS. 23 and 24 show a transport module 300 substantially similar to the other transport modules disclosed here in, except for the front side, which is comprised of two doors 301. In FIG. 23, panels 304 of the two doors have been removed and only the door frames remain. In this embodiment, the two doors 301 may be rotatably attached to the sides of the transport module such that they may swing open and apart from one another. Simple hinges may be used to allow the doors to swing open enclosed in this fashion. A bolt, latch or other mechanism may be used to connect the doors 301 to one another when they are closed. Other mechanisms may also be used to secure the doors 301 and a closed position.

Figure 25:
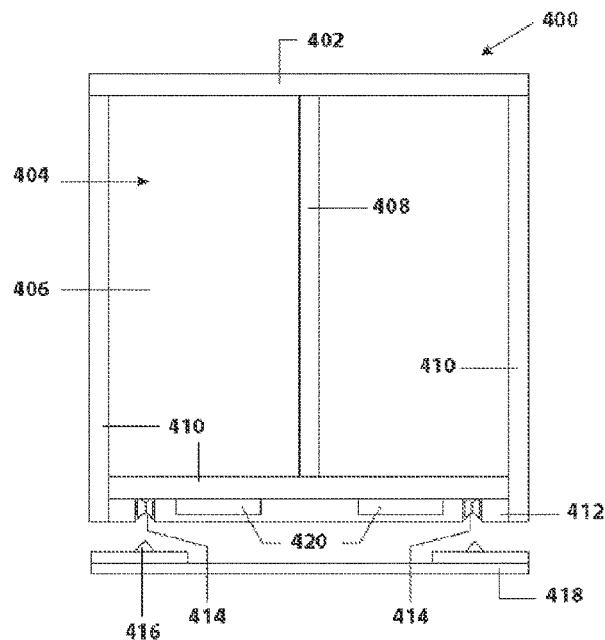
FIG. 25 is a front view of an alternative embodiment of a transport module and tracks in accordance with the principles of the invention.

FIG. 25 shows rear view of an embodiment of a module 400 having a top 402 and a rear wall. 404 comprised of a panel 406 a mullion 408 and a plurality of beams for 10 about the periphery of the panel 406. The base 412 includes recessed, grooved wheels 414 that align with tracks 416 located on a platform 418. The base 412 may also include two channels 420 four accommodating the prongs of a forklift. In this embodiment, the channels 420 are not open at the bottom, but rather are enclosed. This may be beneficial to avoid tipping of the module. Generally, it may be desirable to utilize a forklift having very wide forks to allow using channels with open bottoms. Wide forklift forks and channels spread far apart may increase stability of the module when it is manipulated by a forklift.

Figure 26:
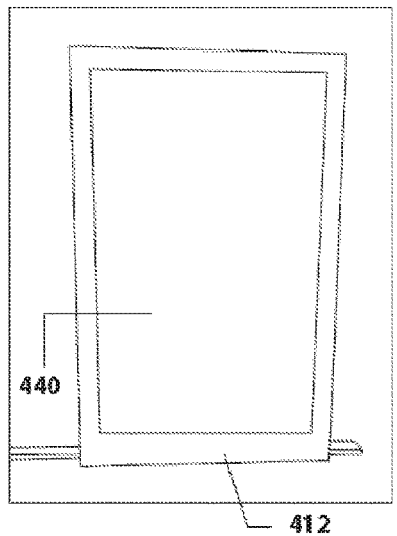
FIG. 26 is a front perspective view of an alternative embodiment of a transport module engaged with tracks in accordance with the principles of the invention.
Figure 27:
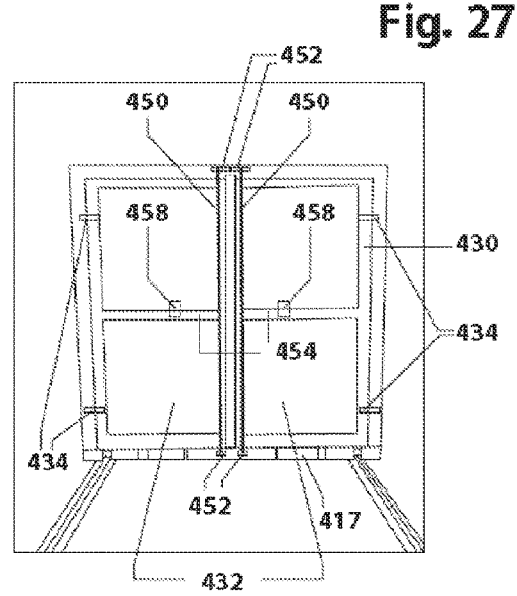
FIG. 27 is a side view of an alternative embodiment of a transport module engaged with tracks in accordance with the principles of the invention.

FIGS. 26 and 27 show a front view and a side view of a module 400. Module 400 includes a front 430 having two doors 432. The doors 432 may be attached by hinges 434, which may facilitate opening the doors 432, approximately 270° such that they are flush with the side walls 440. It may be desirable to allow the doors to open 270° and to provide a latch or hook in the side wall 440 to attach the doors 432. This may position the doors 432, such that they are out of the way of a person adding regrouping objects from the module 400. This may also prevent strong wind or other forces from manipulating the doors 432 and an unwanted fashion.

FIG. 26 shows a pivoting rods 450 having tongue and groove type latches 452 at the top and bottom. An operator may pull handles 454 two pivot the rods 450 to engage and disengage latches 452. Padlock latches 458 may include two brackets having holes of alignment for inserting a padlock. This figure illustrates one of many mechanisms by which a door of a module may be opened and closed, and provides a means for unlocking a module.

Figure 28:
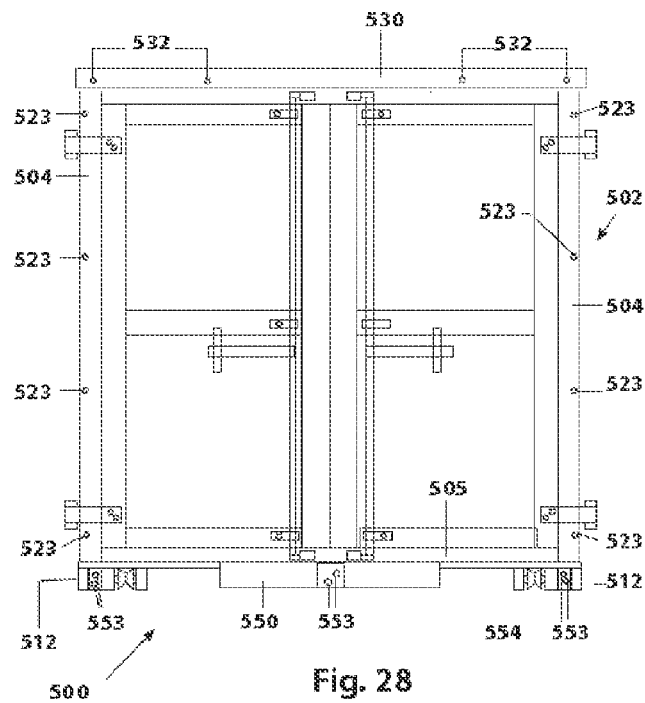
FIG. 28 is a front view of an alternative embodiment of a transport module in accordance with the principles of the invention.

FIG. 28 shows a front view of an alternative embodiment of a module 500. Module 500 may include a front 502 similar to that shown in FIG. 26. The front 502 may include peripheral support beams 504, transverse support beams 505, and two doors 506. The doors 506 may have lateral support beams 507 located on the lateral sides of panels 508 and may include medial support beams 509 on the medial sides of panels 508. The medial support beams 509 may be substantially flush with each other when the doors 506 are closed. Optionally, a rubber sealing strip may be placed on one or both of the medial support beams 509 to create a seal when the doors are closed. Optionally, one of the medial support beams may include a lip that partially extends over the adjacent medial support beams, providing a better seal, but requiring that one door 508 be closed first. The doors 506 may optionally include medial transverse support beams 501 as well as peripheral transverse support beams 511. The doors 506 may be attached to the peripheral support beams 504 by hinges 510 that may allow the doors 506 to rotate 270° such that they are flush with the side walls of the module 500. Optionally, the doors 506 and side walls may include mechanisms for retaining the doors 506 in an open position, which may optionally provide for the doors 506 being flush wish the side walls to avoid the doors 506 from being in an undesirable location, such as, for example, protruding outward from the module 500 such that they may be susceptible to manipulation by wind or other unpredictable forces.

The doors 506 may include a mechanism for securing the doors in a closed position and may optionally includes a mechanism for locking the doors 506. In this embodiment, the doors include pivoting rods 514 which may be held in place by a series of brackets 516 and may also include latches 518 at each end of the rods 514. When the rods 514 are pivoted by applying torque force to the rods 514, for example by engaging and rotating handles 520, the latches may engage to secure the doors 506 in a closed position. The handles 520 may also include padlock brackets 522 that accommodate padlocks for locking the doors in the closed position.

In FIG. 28 module top 530 may also be seen fitted over the front 502. Base 550 may be attached to the bottom of the front 502. Base 550 may include forklift channels 552, recessed wheels 554 and floor panel 556. The mechanisms by which the base 550 may removably attach to the front 502, the sidewalls and the rear wall of the module 500 may be better understood by referring to the remaining figures. The front 502 may also include rubber bumper 527 located between latches 518, and bumpers 750 proximal to the hinges 510. The bumpers may protrude further from the front 502 than either the latches 518 or hinges 510. When modules 500 are stored in a trailer or other vessel, they may abut each other in order to maximize use of space. By including bumpers 527 and/or 750, the modules may be pushed together such that all the modules in a space abut one another, without causing damage to the latches, hinges, rods or other mechanisms located on the front, or on other locations about the module. Rubber coating or a rubber mat may be incorporated onto any of the components or surfaces of the module, including the inside walls, floor and/or ceiling, in order to prevent damage to items placed within the module and/or to better seal the module against the elements.

Figure 29:
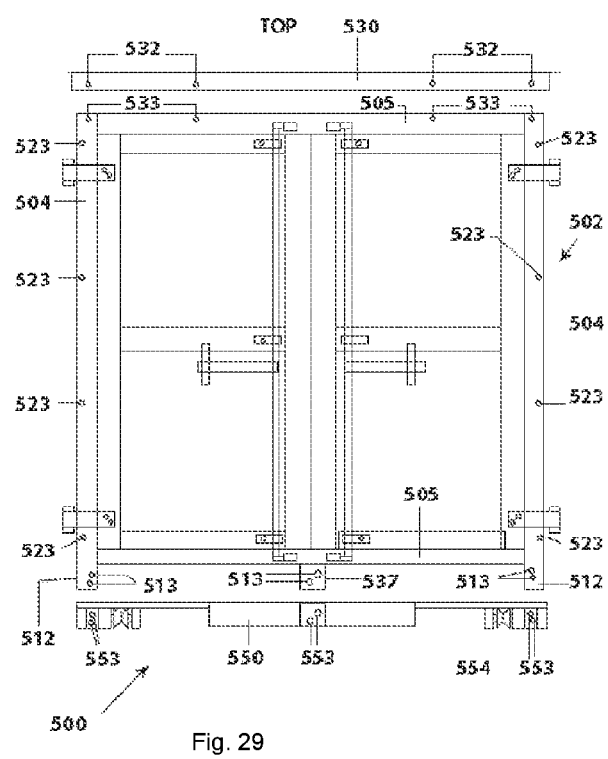
FIG. 29 is a front partially exploded view of an alternative embodiment of a transport module in accordance with the principles of the invention.

FIG. 29 shows a partially exploded view of the module 500. Top 530 may be comprised of a substantially unitary body having a top panel and peripheral downward extending sidewalls that may form a skirt that may prevent water or other materials from entering the module 500 from the top. The top 530 may include a plurality of bolt holes 532 that may correspond to bolt holes 533 located in the transverse support beam 505 of the front 502, and may optionally also be found in the peripheral support beams 504. Peripheral support beams 504 may also include bolt holes 523 that may facilitate attachment to the sidewalls, not shown. In this embodiment, the bolt holes 523 may be used to facilitate removable engagement between the front 502 and the top 530 and the sidewalls not shown. Optionally, bolt holes 523 may be used for engaging by means of other mechanisms such as for example, rivets, screws, dowels, linchpins or the like. Optionally, mechanisms other than bolt holes may be used. The transverse support beam 533 and the peripheral support beams 504 may be desirable locations for mechanisms for removable attachment due to their proximity to adjacent components of the module. The various support beams may also be desirable locations for mechanisms for removable attachment, your removable attachment or other optional features due in part to their rigidity or other characteristics.

Peripheral support beams 504 may also optionally include tabs, 512 that may have bolt holes 513. Tabs 512 may extend downward from the peripheral support beams 504 and may be designed to engage the base 550 at the bolt holes 553. The front 502 to may also include a tab 537 protruding downward from the center of the peripheral support beam 505. Tab 537 in the center for the peripheral support beam 505 may also have boltholes 513 for engaging corresponding bolt holes 553 in the base 550. Optionally, additional tabs 512 having additional bolt holes 513 may protrude downward to provide engagement point for removable or irremovable engagement with base 550. As will be explained, the various components of a module 500 may be easily and quickly assembled and disassembled. This may facilitate storage of the modules themselves by stacking the component parts, which may be substantially planar.

Figure 30:
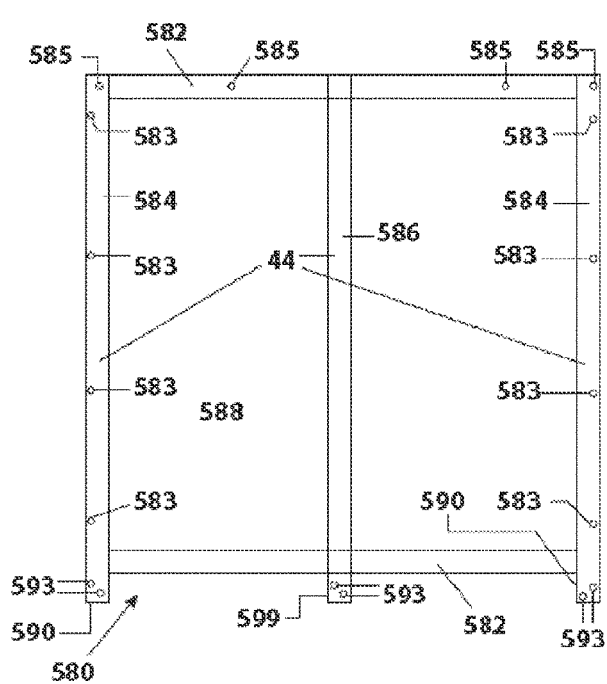
FIG. 30 is a front view of a rear panel of an alternative embodiment of a transport module in accordance with the principles of the invention.

FIG. 30 shows a rear wall 580, which may be utilized as parts of the module 500. Rear wall 580 may include transverse support beams 582, peripheral support beams 584, and a mullion 586. Vertical support beam mullion 586 is so named because of its use for providing structural support as a vertical beam for panel 588 a manner similar to a mullion, or an engaged column as used as a structural component in architecture. Panel 588 may be comprised of one or more panels.

Peripheral support beams 584 may include bolt holes 583 four engagement with the sidewalls. Bolt holes 585 may also be located in peripheral support beams 584 and/or transverse support beam 582 four engagement with the top 530. Rear wall 580 may also optionally include one or more tabs 590 that may extend downward from peripheral support beams 584. The rear wall. 580 may also include a central tab 599 protruding downward from transverse support beam 582 or from mullion 586. Tabs 590 and 599 may include bolt holes 593 to facilitate engagement with base 550.

Figure 31:
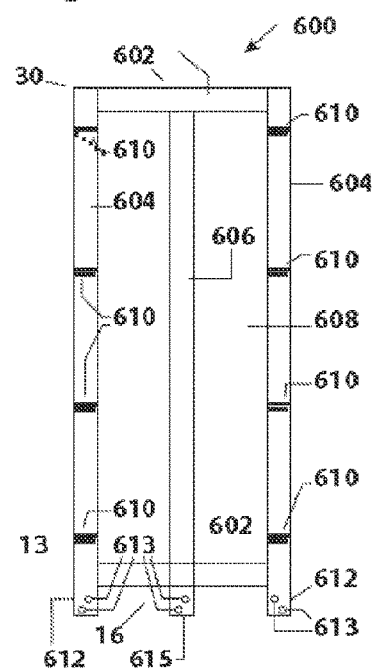
FIG. 31 is a front view of a side panel of an alternative embodiment of a transport module in accordance with the principles of the invention.

FIG. 31 shows a side wall 600. Sidewalls 600 may be located on either side of a module 500 and may removably engage to the rear wall 580, the front wall 502, the top 530 and the base 550. Sidewalls 600 may include transverse support beams 602, peripheral support beams 604, mullion 606 and panel 608. As with the panel 588 of the rear wall 580, the panel 608 of the side wall 600 may be of a single unitary body, or may be comprised of more than one panel. Sidewalls may optionally include one or more medial transverse support beams. The sidewalls 600 may include bolt holes 610 in peripheral support beams 604 which may facilitate removable or permanent engagement with the front 502 and rear wall 580. Sidewalls 600 may also include one or more tabs 612 that may protrude downward from, or as part of, peripheral support beams 604. A central tab 615 may protrude downward from mullion 66 or transverse beam 602. Tabs 612 and 615 may include bolt holes 613 in order to facilitate removable engagement with the base 550.

Figure 32:
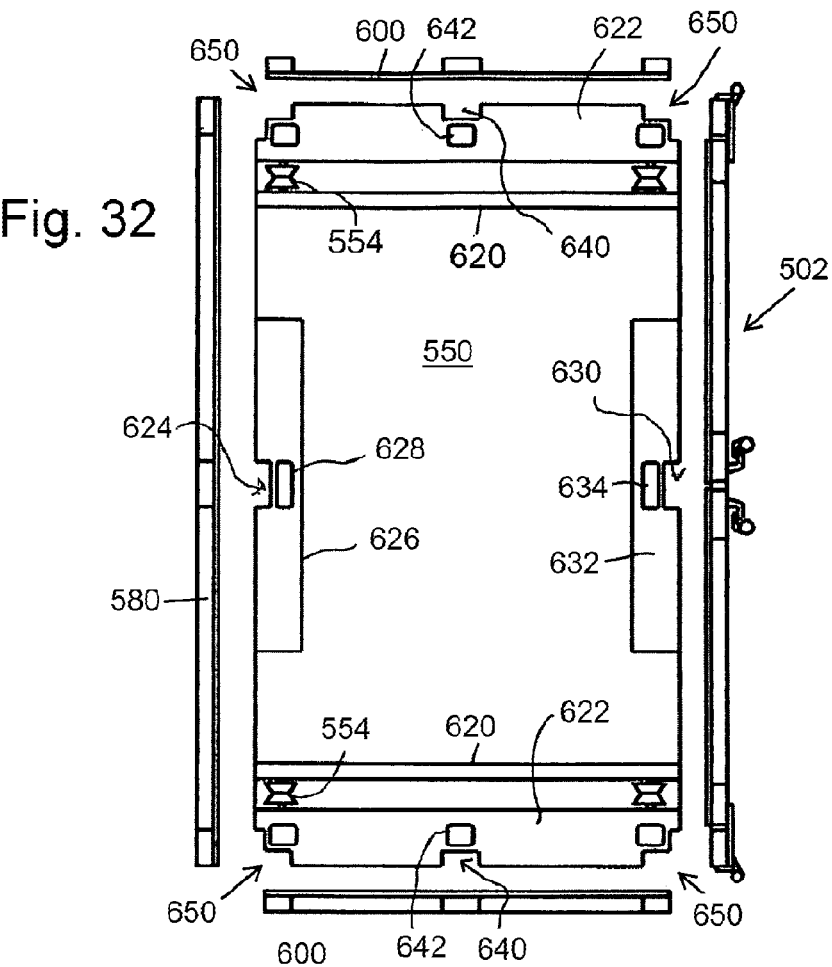
FIG. 32 is a bottom exploded view of an alternative embodiment of a transport module in accordance with the principles of the invention.

FIG. 32 shows an exploded view of a module 500 and from the bottom. The base 515 may include medial beams 620, distal beams 622 and recessed wheels 554 therebetween. In this Figure, a plurality of slots may be seen and base 550. Slot 624 may be located in a support beam 626 and designed to accommodate central tab 599 protruding downward from rear wall 580. An opening 628 may provide access to the interior of support beams 626 in order to allow loosening and tightening of nuts and bolts used to secure central tab 599 in slot 624. Opening 628 may be particularly desirable when metal tubing is used for the support beam 626. If other structures, for example, solid structures, are used as support beams, and opening may not be desirable if bolts of sufficient length are utilized.

Slot 630 in support beam 632 may be designed to accommodate central tab 537 in front 502. An opening 634 may provide access to the interior of a support team in order to facilitate application of nuts and bolts to bolt holes 513 or two other means for removable engagement between tab 537 and slot 630. Slots 640 may be designed to accommodate central tabs 615 of sidewalls 600. Distal support beams 622 may include openings 642, again to allow access to nuts and bolts utilized with bolt holes 613 to removably engage the sidewalls to the base 550. The front 502, rear wall 580, and sidewalls 600 may all be removably attached to the base 550 by securing the tabs into slots in the base 550 by means of nuts and bolts placed through bolt holes or other mechanisms of removable attachment. Each of the corners 650 of the base 550 includes slots for attachment to tabs of the front 502, the rear wall 580 and the sidewalls 600.

Figure 33:
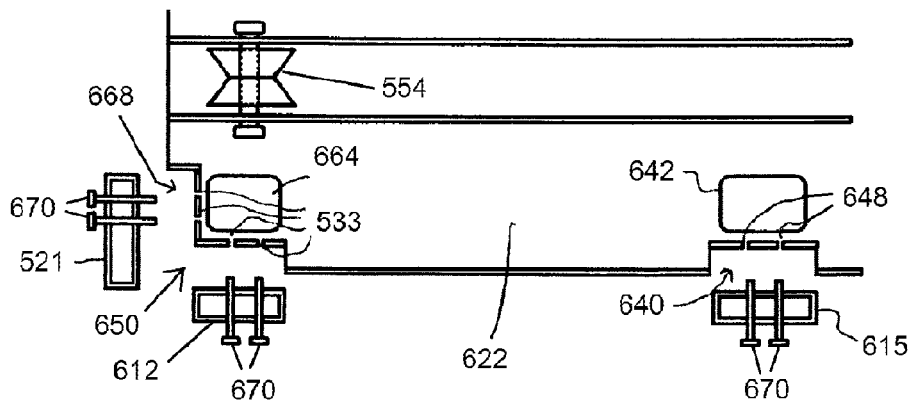
FIG. 33 is a bottom enlarged view of a portion of the exploded view of FIG. 32.

FIG. 33 shows an enlarged bottom exploded view of one of the corners of the base 650. Central tab 615 of side wall 600 may be seen near slot 640 having bolts 670 extending through tab 615. In this enlarged view, bolt holes 648 in distal beams 622 may be seen. Distal beam 622 may also include an opening 664 that may provide access to bolt holes 553 found in L shaped slot 668. Slot 668 may be designed to accommodate tab 512 of front 502 and tab 612 of sidewalls 600. Additional bolts, 670 may be seen extending through tabs, 512 and 612. When bolts, 670 are extended through tabs 512, 612 and 615 and through bolt holes 553, nuts, may be engaged to the bolts, 670 by access through openings 642 and 664. Tabs 512 and 612 may optionally include bolt holes or other mechanisms for engagement with each other. Thus, the front 502, rear wall 580 and sidewalls 600 may removably engage with base 550 by means of the tabs and slot. Optionally, the tabs and slots may be inverted such that tabs protrude upward from the base 550 such that they may engage slots in the front 502, rear wall 580 and sidewalls. Those skilled in the art will appreciate that this is only one of many possible means for engaging the various components of a module 500. The method shown here, may provide for rigid and secure attachment while also providing means for relatively uncomplicated disassembly of a module 500.

Figure 34:
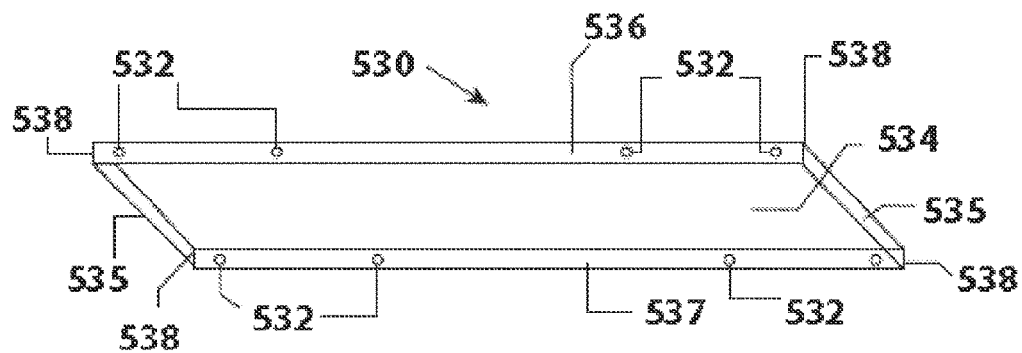
FIG. 34 is a perspective view of a top of an alternative embodiment of a transport module in accordance with the principles of the invention.

FIG. 34 shows a bottom perspective view of top 530. Top 530 may include a top panel 534, two sidewalls 535, a front wall 536 and a rear wall 537. The top 530 may be comprised of a single piece of material. For example, a single piece of sheet metal may be cuts, and bent to form the top panel 534, the sidewalls 535, the front wall 536 and rear wall 537. The corners 538 may be welded together in order to provide a solid, relatively impenetrable top 530. This may be desirable to prevent objects, including water, from entering through cracks in the top 530. Optionally, the top may be formed from several components. In this embodiment, the front wall 536 and the rear wall 537 include a plurality of bolt holes 532 to provide removable engagement with the other components of the module 500 by means of bolts, or similar devices. Top 530 in this embodiment does not include support beams or other means for strengthening the structure. A top may optionally include support beams or other components to modify structure. The top 530 may optionally include events or other openings designed to accommodate intrigue or exit of particular objects or to simply provide openings.

Figure 35:
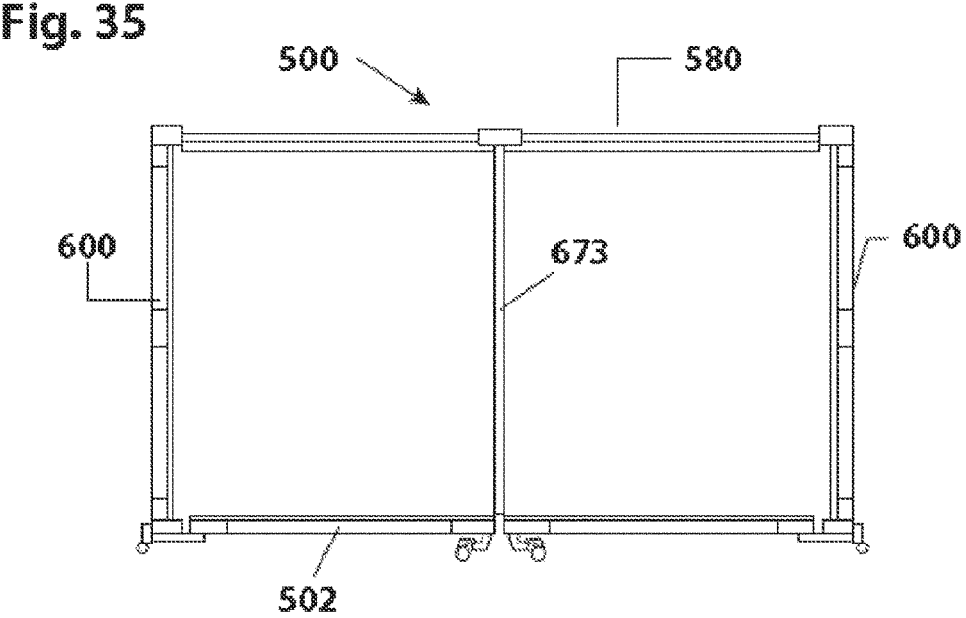
FIG. 35 is a top cross-sectional view of an alternative embodiment of a transport module in accordance with the principles of the invention.

FIG. 35 shows a top cross-sectional view of a module 500 further comprising a partition 673. Partition 673 may be solid, semipermeable or permeable. The partition may be a permanent feature or may be removable. It may be desirable to utilize a partition when objects stored in the module 500 may be kept separately. In this embodiment, each of the doors in front 502 may accommodate a separate padlock. If a module 500 includes a partition, to separate operators may utilize separate halves of the module 500 without interference from one another.

Optionally, the doors may be designed to open upward or downward, or may be flexible and attached to tracks such that the doors may retract like a garage door. Optionally, doors may be located on the sides or top of the transport module. The transport module may optionally include transparent windows for viewing the inside of a module and may also include events to provide air circulation.

Optionally, the modules may be airtight, watertight or otherwise hermetically sealed. In some instances, it may be desirable to form the transport modules using materials that may allow it to withstand substantial internal or external forces. Optionally, transport modules may be formed from very lightweight materials.

Figure 35A:
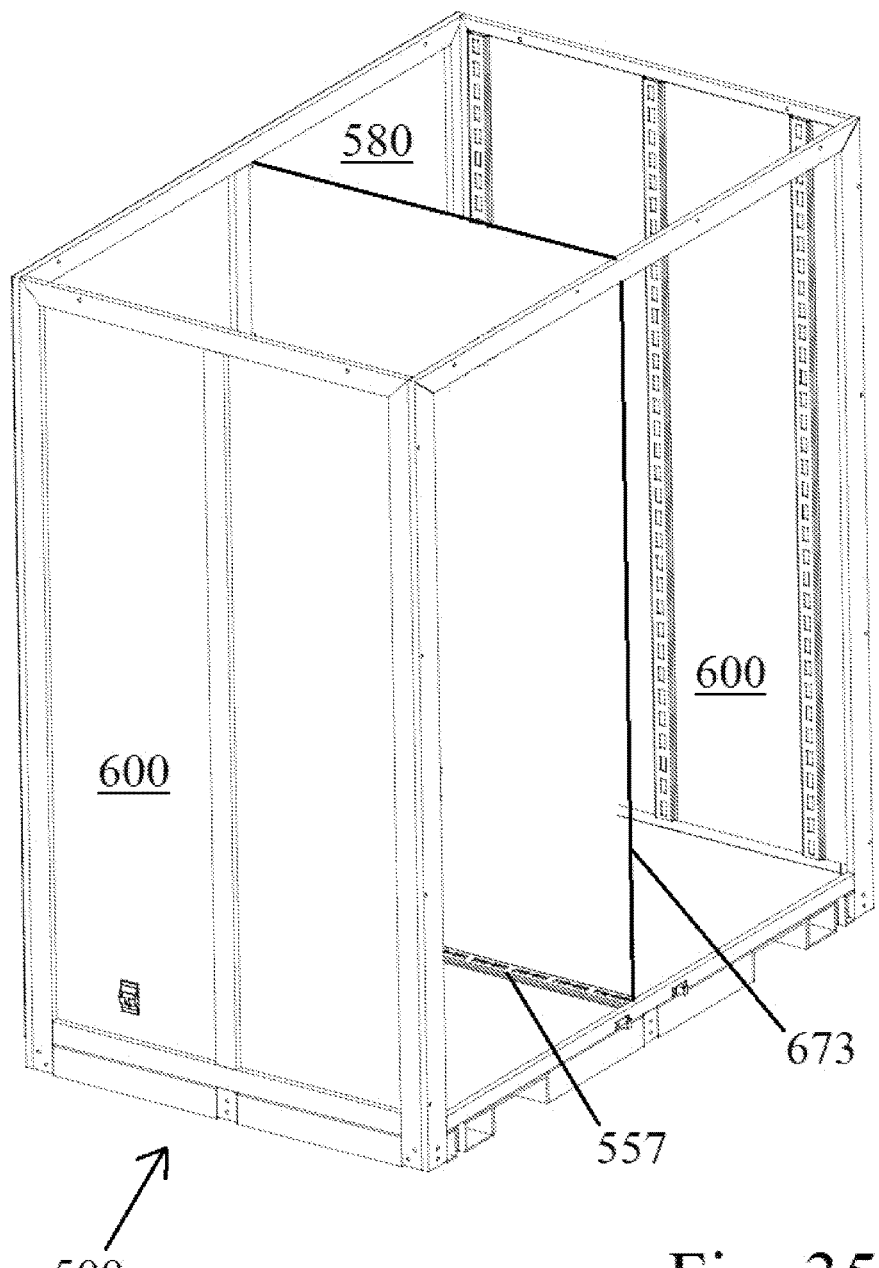
FIG. 35a is a perspective view of an alternative embodiment of a transport module in accordance with the principles of the invention.

FIG. 35a shows a module 500 including the partition 673. Partition 673 may be removably engageable to a track 551 that runs down the middle of base 550. Partition 673 may be attached to the track 551 by any number of mechanisms including tongue and groove, tabs, and inserts, bolts, dowels and the like.

FIG. 36 shows a motorized forklift jack 700 and accordance with the principles of the invention. The forklift jack 700 includes two prongs 702 and a body 703. The body 703 may house, a motor and controls for operating the forklift jack 700. The prongs 702 may be about 10 inches wide and may be sized to fit within the forklift channels in the bases of the modules described above. The prongs 702 may be wider apart than standard forklift prongs, and only allow for 12 inches or less overhang on each side. This may reduce the likelihood that a module transported using the forklift jack 700 will tip over to one side or the other, even if the weight of the module is not evenly distributed. When loading one of the modules described above, persons may not pay attention to weight distribution. This may be especially true when a partition separates two sides of a module. By widening the distance between the prongs 702 and minimizing overhang, unbalanced weight distribution is less likely to result in a module tipping over.

Figure 37:
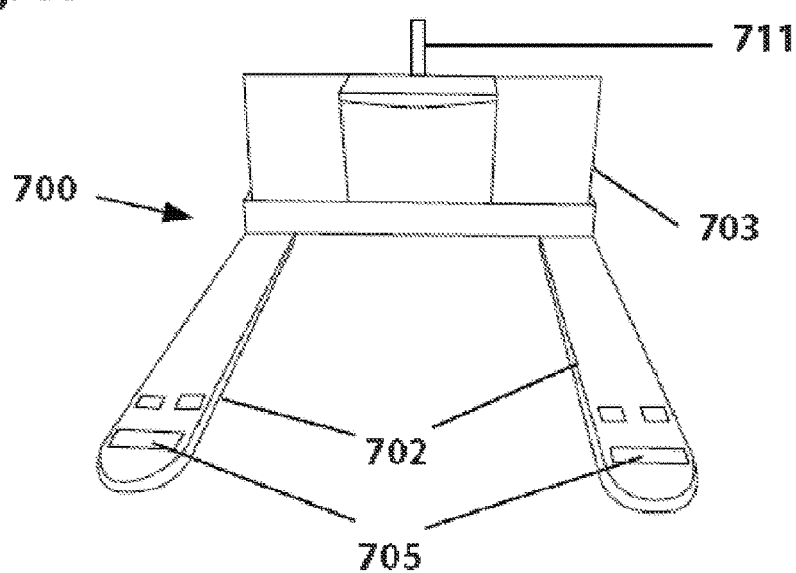
FIG. 37 is a front perspective view of a forklift Jack in accordance with the principles of the invention.

FIG. 37 shows a motorized forklift jack 700 from a front perspective view. Control handle 711 may protrude upward from body 703 to facilitate easy access of the controls to an operator. Each prongs 702 includes with in it a support wheel 705. As with other forklift jacks, support wheel 705 in prongs 702 may be adjusted in order to raise the jack and objects supported by it above the ground. Forklift jack 700 may be designed to only raise an object a few inches off the ground, between about 4 inches to about 1 foot.

Figure 38:
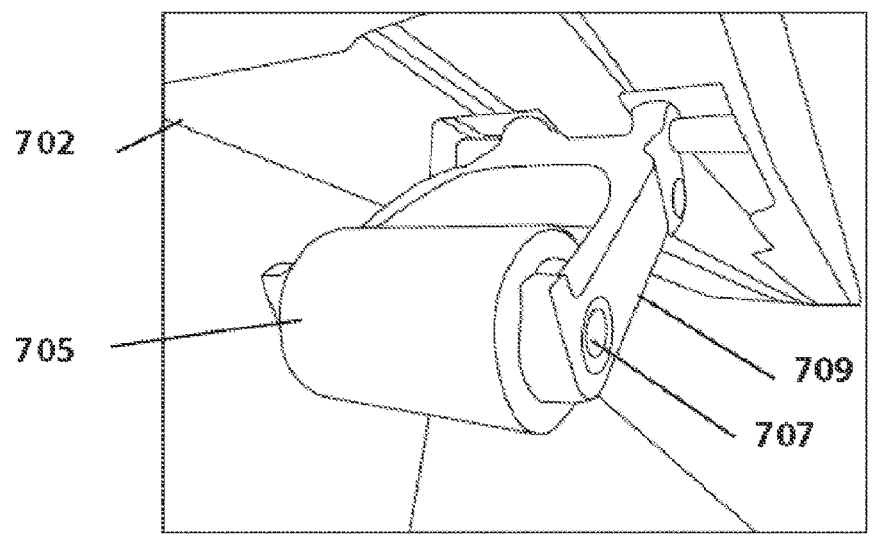
FIG. 38 is a perspective view of a support wheel of a forklift Jack in accordance with the principles of the invention.

FIG. 38 shows a support wheel 705, when it is in the lifting position, protruding downward from the prongs 702. Wheel 705 may rotate about an axle 707. A pivoting arm 709 may be actuated to move downward, thereby causing the forklift jack 700 and anything supported by it be lifted above the ground.

Support wheel 705 may be comprised of a sturdy material such as a metal alloy or steel. It may be desirable for wheel 705 to be comprised of a particularly strong material because the modules may be particularly heavy. Due to the size of the modules, they may carry many items. Where a module is constructed of particularly strong material such as metal, it may be very heavy when full. Therefore, use of rubber or even plastic in constructing the wheel 705 may be contraindicated.

Figure 39:
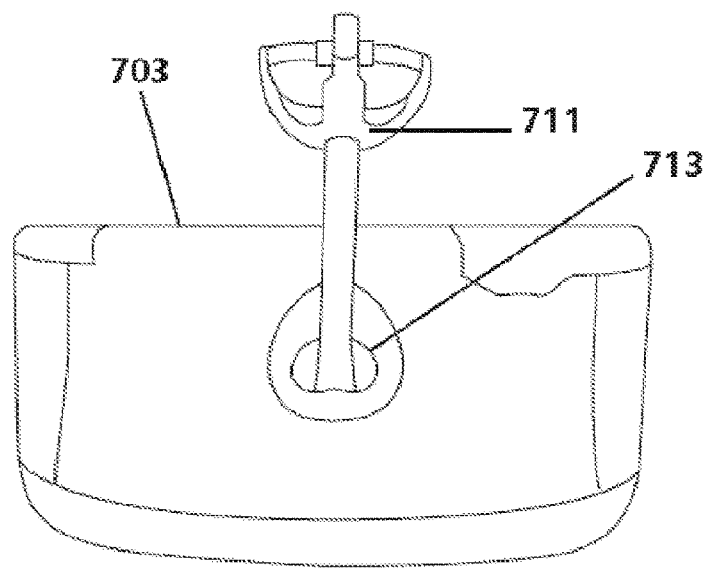
FIG. 39 is a perspective view of the body of a forklift Jack in accordance with the principles of the invention.

FIG. 39 shows the body 703 and the control handle 711 from another direction. In this embodiment, control handle 711 may be attached to body 703 by a pivot mount 713. The forklift jack 700 may be powered by an electric motor, a gas motor or other suitable device. Optionally, the jack 700 may be designed with a cab including a seat and allowing an operator to be seated while operating the jack 700. Optionally, the jack 700 may not be motorized and may be operated only by human power.

FIG. 40 shows an alternative embodiment of a transportation module 800 and accordance with the principles of the invention. Transportation module 800 may include a side wall 804, a top 802 doors 806 on front 808 all supported by a base 810. In this embodiment, sidewalls 804 may include peripheral lateral support beam 812 and a medial longitudinal support beam 814, which may provide rigidity and support to panel 816. Top 802 may be comprised of a top panel 818 having downward extending side wall 820 and front wall 822, which may include bolt holes 824 and 826, respectively, which may provide attachment to side wall 814 and front 808, respectively. Side wall 804 may include lateral tabs 828 and a medial tab 834 attachment to base 810. Similarly, the front. May include lateral tabs 832 and medial tab 834 for attachment to base 810.

Figure 41:
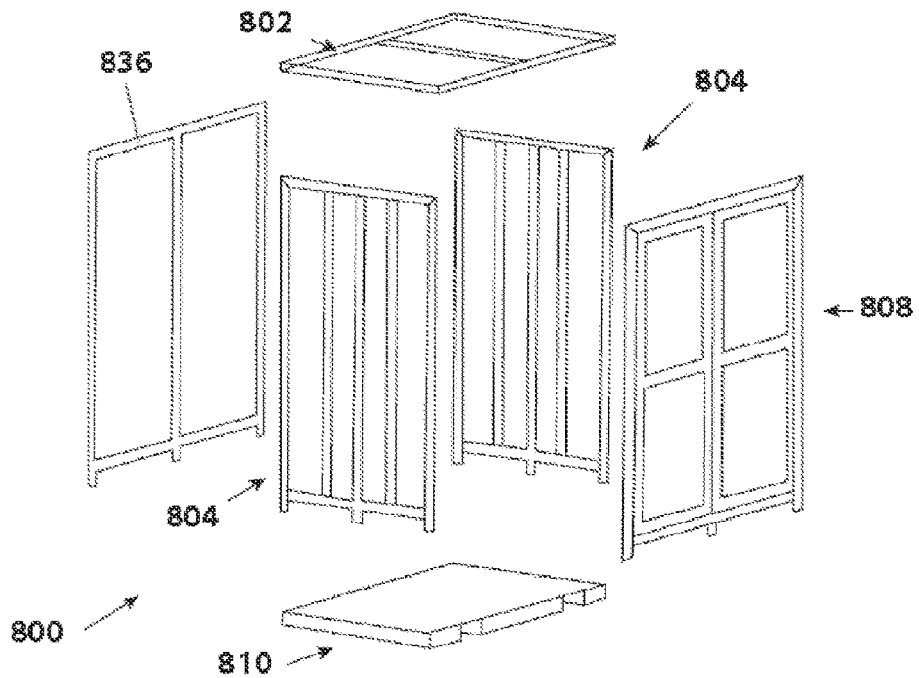

FIG. 41 shows an exploded view of transportation module 800. Here, rear wall 836 may be seen. In addition to top 802, front 808 and side wall 804. In addition, a second side wall 804 may be seen. Sidewalls 804 may have lateral symmetry and therefore be interchangeable with one another.

FIG. 42 shows the outside 838 of sidewall 804. Peripheral lateral support beams 812 extends the longitudinal length of the side panel 816. Medial longitudinal support beam 814 also extends the entire longitudinal length of panel 816. Panel 816 may be comprised of one or more panels and may be substantially planar. Panel 816 may be comprised of metal or other rigid and durable material or may optionally be comprised of less durable material. Optionally, panel 816 may even be comprised of cloth fabric, or thin plastic, wire screen or other material. Optionally, panel 816 may be removable or may be an optional feature of sidewall 804. Sidewall 804 may also include a top support beam 842 and a bottom support beam 844. Lateral tabs 828 may be part of and/or integral with lateral support beams 812. Similarly, medial tab 830 may be part of and/or integral with medial support beam 814.

FIG. 43 shows the inside 840 of sidewall 804. Interior side, 840 of sidewall 804 may optionally include one or more struck channels 846. Start channels 846 may be used to support shelves within the interior of transportation module 800, may provide additional support for sidewall 804 or may serve other functions. In this embodiments, sidewall 804 does not include transverse beams. Sidewalls 804 may optionally be reversible such that the inside 840 may become the outside of sidewall 804 while the outside 838 may become the inside of sidewall 804.

FIG. 44 shows the outside 848 of rear wall 836. Rear wall 836 may include lateral tabs 854 attachment to the base 810 and may also include medial tab 852. Also, for attachment to base 810. In this embodiments, the outside 848 consists primarily of panel 854. Panel 854 may be made of any rigid material, for example, metal, would, carbon fiber, plastic, or the like. Optionally, panel 854 may be comprised of a less rigid material similar to panel 816 of sidewalls 804. That is, panel 854 may be comprised of cloth, fabric, mesh, a screen or similar structure.

FIG. 45 shows the inside 856 of rear wall 836. The inside 856 of rear wall 836 may include peripheral lateral support beams 858 and a medial longitudinal support team 860. Rear wall 836 may also include a top horizontal support beam 862 and a bottom horizontal support beam 864. Tabs 850 may be integral with support beams 858 and tab 852 may be integral with been 860.

FIG. 46 shows the inside 870 of front 808. Front 808 may have peripheral lateral support beams 872, a top horizontal support beam 874 and a bottom horizontal support of being 876. Tabs 832 may be integral with beams 872. The inside 878 of doors 806 may be substantially flat and comprised primarily of panels 880. A rubber seal or similar sealing mechanism 882 may be located between the doors 806.

FIG. 47 shows the front 808 having doors 806, which may be attached to peripheral beams 872 by hinges 884. Doors 806 may also include handles 886, which may be used to rotate rods 888 to disengage latches 890 in order to open and close the doors 806.

FIG. 48 shows an exploded view of the base 810, showing the floorboard 894 detached from the other components of the base 810. Base 810 may include forklift channels 896 that may engage with the prongs of a forklift to allow the transportation module 800 to be lifted and moved. Base 810 may also include lateral beams 898 and medial beams 900 that may be substantially parallel to each other and to channel 896 and may form a channel 902 in which one or more wheels 904 may be located. Wheels 904 may be positioned and sized such that they do not substantially protrude from channel 902. Wheels 904 may have a groove, or an inverted V-shaped or may be of any other design. In this embodiment, four wheels 904 are shown. The base 810 may optionally include fewer than four wheels, or may include more than four. Also may be seen our several slots 906 for engaging the side walls, the front and the rear wall. Optionally, the slots 906 may be utilized to engage posts that may extend vertically upward from the base 810. The posts that may engage the slots 906 may be substantially similar to the beams used to provide rigidity, structure, or strength to the other components of the transportation module 800. Beams 900 and 898 may be comprised of metal tubing, metal pipe or other similar structures, as may the other beams of transportation module 800.

FIG. 49 shows top 802, including the top surface 818 sidewalls 820 and front wall 826. The inside, nine, 10 of the top 802 may include a support beam 912.

FIG. 50 shows a pallet 920 in accordance with the principles of the invention. Pallet 920 has a top surface 922, lateral support beams 924 and medial support beams 926 pallet 920 may also include channels 928 that may accommodate the prongs of a forklift or similar device. Pallet 920 may also include one or more transverse central support beams 930.

FIG. 51 shows the pallet 920 without the top surface 922. In this figure, it may be seen that a plurality of transverse central support beams 930 may be used. It may also be seen that one or more recessed wheels 932 may be found in between lateral support beams 924 and medial support beams 926.

FIG. 52 shows an alternative embodiment of a pallet 950. Having a top surface 952 and channels 954 for engaging a forklift or similar device. Pallet 950 may also include a plurality of slots 956, for engagement with vertical posts. The corners 958 may also optionally include L shaped slots 958. Slots 956 and 958 may be utilized to incorporate tabs, as shown in the embodiments of the transportation modules. Optionally posts for forming a fence that may optionally include lateral beams between the vertical posts may be removably engaged with pallet 950.

FIG. 52a shows the pallet 950 having removably attachable, sidewalls 959 and a removable rear wall 953. In this embodiment, rear wall 953 and sidewalls 959 may extend upward from the base ninth 52 anywhere from 6 inches to 6 feet. This design may be preferable to the fully enclosed box when a smaller amount of material is being stored, or transported.

FIG. 53 shows pallet 950 without the top surface 952. Pallet 950 may utilize a plurality of central transverse support beams 962. Similar to support means 930 of pallet 920. Pallet 950 may also optionally include a plurality of recessed wheels 964 that may also optionally be grooved.

FIG. 54 shows the transportation module 800 being engaged with forklift jack 700. Prongs 702 enter channels 896 and then exert an upward force on the module 800. The module may be lifted a foot or less off the ground. No bars or restraints may extend under the prongs 702 to prevent the module 800 from tipping over while lifted because the wide placement of the forklift jack and channels 896 may make tipping unlikely.

Whereas, the present invention has been described in relation to the drawings attached hereto, it should be understood that other and further modifications, apart from those shown or suggested herein, may be made within the spirit and scope of this invention. Descriptions of the embodiments shown in the drawings should not be construed as limiting or defining the ordinary and plain meanings of the terms of the claims unless such is explicitly indicated.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A transport module having:
    six substantially planar components comprising a front, a back, a top, a base and two sides;
    wherein each of the components are removably attached to one another such that the module has a disassembled configuration and assembled configuration;
    wherein the front may be comprised of one or more doors which may slide into grooves or may be rotatably attached to the sides, the top, or the base;
    wherein the base comprises two channels for engaging a forklift or pallet jack;
    at least two tracks on a lift platform and at least two tracks on an interior of a vessel, wherein the at least two tracks on a lift platform align with the at least two tracks on an interior of a vessel;
    wherein the base includes at least four recessed wheels capable of engaging the at least two tracks on a lift platform and at least two tracks on an interior of a vessel to facilitate sliding movement of the module;
    wherein the at least four recessed wheels do not touch the ground when the base lies on a flat surface.

2. The transport module of claim 1 wherein the vessel contains at least one additional module, each module substantially abutting adjacent modules in the vessel.

3. The transport module of claim 1, further comprising a top.

4. The transport module of claim 3 wherein the front, the back and the two sides include tabs extending downward and the base includes slots corresponding to each tab; wherein the tabs are inserted into the slots when the module is assembled.

5. The transport module of claim 1, wherein the base includes two distal beams and two medial beams defining a channel therebetween, wherein the recessed wheels are located in the channels defined by the distal beams and the medial beams.

6. The transport module of claim 1, wherein the front, the back and the two sides include tabs extending downward and the base includes slots corresponding to each tab; wherein the tabs are inserted into the slots when the module is assembled, and
    wherein the six substantially planar components may be stacked when disassembled.

* * * * *